United States Patent
Kingston et al.

(10) Patent No.: US 9,595,036 B2
(45) Date of Patent: *Mar. 14, 2017

(54) SERVICE FOR EXCEEDING ACCOUNT THRESHOLDS VIA MOBILE DEVICE

(71) Applicant: BANK OF AMERICA CORPORATION, Charlotte, NC (US)

(72) Inventors: Tamara S. Kingston, Peoria, AZ (US); John Franklin Tuders, Harrisburg, NC (US); Ross Matthew Feldman, Matthews, NC (US); Marc Lance Warshawsky, Davidson, NC (US); Erik Stephen Ross, Charlotte, NC (US); Elbert Lee Whitler, Webster Groves, MO (US); Mark D. Zanzot, Huntersville, NC (US); Ketil Bjugan, Charlotte, NC (US); Scott Mastbrook, Charlotte, NC (US); William Sydney Ivey, Charlotte, NC (US); Mark Allan Nelson, Waxhaw, NC (US); Brenda Lisbeth Smyth, Fenton, MO (US); Doris Maria Garrett, Walnut Creek, CA (US); Jonathan H. Tucker, Charlotte, NC (US); Catherine Stokes Pullen, Mount Holly, NC (US); Paul Ronald DeKoster, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/840,552

(22) Filed: Mar. 15, 2013

(65) Prior Publication Data

US 2013/0218697 A1 Aug. 22, 2013

Related U.S. Application Data

(63) Continuation-in-part of application No. 13/033,492, filed on Feb. 23, 2011, now abandoned, and a
(Continued)

(51) Int. Cl.
*G06Q 20/00* (2012.01)
*G06Q 20/40* (2012.01)
(Continued)

(52) U.S. Cl.
CPC .......... *G06Q 20/405* (2013.01); *G06Q 20/20* (2013.01); *G06Q 20/40* (2013.01); *G06Q 20/407* (2013.01);
(Continued)

(58) Field of Classification Search
CPC .................................................... G06C 20/20
(Continued)

(56) References Cited

U.S. PATENT DOCUMENTS 6,021,400 A 2/2000 Gallacher et al.
6,081,792 A 6/2000 Cucinotta et al.
(Continued)

OTHER PUBLICATIONS

U.S. Appl. No. 12/879,866, filed Sep. 10, 2010, Quintiliani et al.
(Continued)

*Primary Examiner* — Hunter Wilder
(74) *Attorney, Agent, or Firm* — Michael A. Springs; Moore & Van Allen PLLC; Peter B. Stewart

(57) ABSTRACT

In general terms, embodiments of the present invention relate to methods and apparatuses for providing a service for exceeding account thresholds via a mobile device. For example, in some embodiments, a method is provided that includes: (a) receiving transaction information associated with a transaction, where the transaction involves an account, a transaction machine, and a holder of the account;
(Continued)

(b) determining, based at least partially on the transaction information, that the account will incur an excess threshold amount as a result of the transaction; (c) prompting the holder to consent to the excess threshold amount via the mobile device, where the holder is associated with the mobile device; (d) receiving the holder's consent to the excess threshold amount; and (e) authorizing the transaction based at least partially on the receiving the holder's consent.

11 Claims, 6 Drawing Sheets

Related U.S. Application Data continuation-in-part of application No. 12/879,866, filed on Sep. 10, 2010, now Pat. No. 9,047,639.

(60) Provisional application No. 61/416,652, filed on Nov. 23, 2010, provisional application No. 61/436,196, filed on Jan. 26, 2011.

(51) Int. Cl.
*G06Q 20/20* (2012.01)
*G06Q 20/42* (2012.01)
*G06Q 40/02* (2012.01)
*G06Q 30/06* (2012.01)

(52) U.S. Cl.
CPC .......... *G06Q 20/425* (2013.01); *G06Q 30/06* (2013.01); *G06Q 40/02* (2013.01)

(58) Field of Classification Search
USPC ......................................................... 705/16
See application file for complete search history.

(56) References Cited

U.S. PATENT DOCUMENTS

| | | | |
|---|---|---|---|
| 6,457,640 B2 | 10/2002 | Ramachandran et al. | |
| 7,216,083 B2 | 5/2007 | Parmelee et al. | |
| 7,370,004 B1 | 5/2008 | Patel et al. | |
| 7,428,495 B2 | 9/2008 | Dhar et al. | |
| 7,644,039 B1 * | 1/2010 | Magee | G06Q 20/1085 705/43 |
| 2002/0040339 A1 | 4/2002 | Dhar et al. | |
| 2002/0055904 A1 | 5/2002 | Mon | |
| 2003/0009418 A1 | 1/2003 | Green et al. | |
| 2003/0033251 A1 * | 2/2003 | Sherlock | 705/43 |
| 2004/0215566 A1 | 10/2004 | Meurer | |
| 2006/0059085 A1 | 3/2006 | Tucker | |
| 2006/0129478 A1 | 6/2006 | Rees | |
| 2006/0212407 A1 | 9/2006 | Lyon | |
| 2006/0249568 A1 | 11/2006 | Scanlon | |
| 2007/0080207 A1 | 4/2007 | Williams | |
| 2007/0106558 A1 | 5/2007 | Mitchell et al. | |
| 2007/0118470 A1 | 5/2007 | Warren et al. | |
| 2007/0262137 A1 | 11/2007 | Brown | |
| 2008/0103970 A1 | 5/2008 | Books et al. | |
| 2008/0210754 A1 | 9/2008 | Lovett | |
| 2009/0055313 A1 | 2/2009 | Elterich | |
| 2009/0081990 A1 | 3/2009 | Granucci et al. | |
| 2009/0089205 A1 | 4/2009 | Bayne | |
| 2009/0094125 A1 | 4/2009 | Killian et al. | |
| 2009/0171837 A1 | 7/2009 | Moreno | |
| 2009/0216676 A1 | 8/2009 | Mathur et al. | |
| 2009/0261161 A1 | 10/2009 | Blossom | |
| 2009/0281904 A1 | 11/2009 | Pharris | |
| 2010/0065628 A1 | 3/2010 | Carmichael et al. | |
| 2010/0235283 A1 | 9/2010 | Gerson | |
| 2011/0082767 A1 | 4/2011 | Ryu et al. | |
| 2011/0125643 A1 | 5/2011 | Cameo et al. | |
| 2011/0202415 A1 | 8/2011 | Casares et al. | |
| 2011/0217994 A1 * | 9/2011 | Hirson et al. | 705/27.1 |
| 2011/0225084 A1 * | 9/2011 | Holt | 705/38 |
| 2011/0320292 A1 * | 12/2011 | Perdue | 705/16 |
| 2012/0066077 A1 | 3/2012 | Kingston et al. | |
| 2012/0066127 A1 | 3/2012 | Kingston et al. | |
| 2012/0264405 A1 | 10/2012 | Bravo et al. | |

OTHER PUBLICATIONS

A-9 Model Consent Form for Overdraft Services, 1 page total; http://www.federalreserve.gov/DCAA/RegulationE/20081218/A-9.pdf.

"5 Ideas to Fix the Ugly in Overdraft Fees", Sep. 23, 2009 (8 pages total); downloaded Sep. 22, 2010; http://thefinancialbrand.com/7795/fixing-overdraft-ugliness/.

* cited by examiner

SERVICE FOR EXCEEDING ACCOUNT THRESHOLDS VIA MOBILE DEVICE

CROSS-REFERENCE TO RELATED APPLICATIONS

The present application is a continuation-in-part application of, and claims priority to, U.S. patent application Ser. No. 13/033,492, which was filed on Feb. 23, 2011, and is titled "Overage Service via Mobile Device," and is incorporated by reference herein in its entirety. The present application also claims priority to U.S. patent application Ser. No. 12/879,866, which was filed on Sep. 10, 2010, and is entitled "Service Participation Acknowledgment System," and which is incorporated by reference herein in its entirety. The present application also claims priority to U.S. Provisional Patent Application No. 61/416,652, which was filed on Nov. 23, 2010, and is entitled Communication Systems," and which is incorporated by reference herein in its entirety. The present application further claims priority to U.S. Provisional Patent Application No. 61/436,196, which was filed on Jan. 26, 2011, and is entitled Communication Systems," and which is incorporated by reference herein in its entirety.

BACKGROUND

Financial institution customers are constantly looking for new and useful ways to better manage their finances. This is particularly so given that most of today's financial institution customers have multiple financial accounts and the effects associated with mismanaging or forgetting about any one of them can lead to unexpected and/or unwanted outcomes. For example, a customer may cause his checking account to exceed the available funds and incur a related surpassed balance payment by engaging in a transaction that he mistakenly believes his account can cover. Accordingly, there is a need to provide methods and apparatuses that help financial institution customers manage their finances in ways that avoid or reduce unexpected or unwanted outcomes.

SUMMARY OF SELECTED EMBODIMENTS OF THE PRESENT INVENTION

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention relate to methods and apparatuses for providing a service for exceeding account thresholds via a mobile device. As a specific example, a financial institution customer may initiate a purchase transaction at a point-of-sale (POS) device that the customer mistakenly believes his checking account can cover. However, before this uncovered transaction is completed, the customer is sent a communication from his financial institution that notifies the customer of the surpassed balance (and/or of the associated surpassed balance payment). In some embodiments, this communication is sent to the customer's mobile phone in real-time and/or while the customer is still standing at the POS device. In addition, the notification may prompt the customer to accept or decline surpassed balance coverage provided by the financial institution that is needed to complete the transaction. Thus, some embodiments of the present invention are configured to notify the customer of a balance exceeding transaction and enable that customer to determine in real-time whether he wants to accept surpassed balance coverage to complete the transaction, all before that transaction is actually completed (and/or before the customer is assessed an surpassed balance payment).

In some cases, the customer may decline the surpassed balance coverage because, for example, the transaction involves a relatively small and/or discretionary purchase. However, in other cases, the customer may accept the surpassed balance coverage because the transaction involves a relatively large and/or an emergency and/or non-discretionary purchase. Either way, the customer is empowered with making this decision, which reduces or eliminates the possibility that the customer will unknowingly or unexpectedly engage in a balance exceeding transaction (and/or unknowingly or unexpectedly incur a surpassed balance payment). In addition, embodiments of the present invention enable the customer to make this decision discreetly, thereby avoiding any potential embarrassment associated with the balance exceeding transaction, surpassed balance coverage, surpassed balance payments, and/or the like.

In more general terms, some embodiments of the present invention provide a method that includes: (a) receiving transaction information associated with a transaction, where the transaction involves an account, a transaction machine, and a holder of the account; (b) determining, based at least partially on the transaction information, that the account will incur a excess threshold amount as a result of the transaction; (c) prompting, via a mobile device, the holder to consent to the excess threshold amount, where the mobile device is associated with the holder; (d) receiving the holder's consent to the excess threshold amount; and (e) authorizing the transaction based at least partially on the receiving the holder's consent.

In some embodiments of this method, the receiving the transaction information is based at least partially on the holder presenting account information at the transaction machine, and the prompting the holder to consent to the exceeded threshold includes prompting the holder to re-present the account information at the transaction machine. In some of these embodiments, the receiving the holder's consent to the exceeded threshold is based at least partially on the holder re-presenting the account information at the transaction machine, such that the holder re-presenting the account information at the transaction machine serves to indicate the holder's consent to the exceeded threshold.

In some embodiments, the method further includes: (a) prompting, via the mobile device, the holder to consent to completing the transaction; and (b) receiving the holder's consent to completing the transaction. In some of these embodiments, the receiving the transaction information is based at least partially on the holder presenting account information at the transaction machine, the prompting the holder to consent to completing the transaction includes prompting the holder to re-present the account information at the transaction machine, and the receiving the holder's consent to completing the transaction is based at least partially on the holder re-presenting the account information at the transaction machine, such that the holder re-presenting the account information at the transaction machine serves to indicate the holder's consent to completing the transaction.

In some embodiments of the method, the receiving the transaction information includes receiving an authorization request associated with the transaction, and the receiving the transaction information is based at least partially on the holder presenting account information at the transaction machine. In some of these embodiments, the method further includes: (a) declining the authorization request based at least partially on the determining that the account will incur the excess threshold amount; (b) prompting, via the mobile device, the holder to re-present account information at the transaction machine, where the prompting the holder to re-present occurs after the declining the authorization request; (c) receiving a second authorization request associated with the transaction, where the receiving the second authorization request is based at least partially on the holder re-presenting the account information at the transaction machine; and (d) approving the second authorization request based at least partially on the receiving the holder's consent to the excess threshold amount.

In some embodiments, the method further includes sending, to an address accessible to the mobile device, a confirmation message that confirms the holder's consent to the exceeded threshold. In other embodiments, the method includes sending disclosure information to the holder before the receiving the transaction information, where the disclosure information defines one or more terms of a service for exceeding account thresholds. In some of these embodiments, the prompting the holder to consent to the exceeded threshold includes prompting the holder to agree to the one or more terms of the service for exceeding account thresholds defined in the disclosure information.

In some embodiments, the method further includes presenting, to the holder and via the mobile device, information associated with an exceeded threshold payment, where the exceeded threshold payment is associated with the exceeded threshold. In other embodiments, the method includes assessing the account an exceeded threshold payment based at least partially on determining that the account settled negative at the end of the day in which the transaction occurred. Additionally or alternatively, in some embodiments, the method includes determining not to assess the account an exceeded threshold payment based at least partially on determining that the account settled non-negative at the end of the day in which the transaction occurred.

In some embodiments, the method further includes: (a) receiving second transaction information associated with a second transaction, where the second transaction involves a second account, a second transaction machine, and a second holder of the second account; (b) determining, based at least partially on the second transaction information, that the second account will incur a second excess threshold amount as a result of the second transaction; (c) prompting, via a second mobile device, the second holder to consent to the second excess threshold amount, where the second mobile device is associated with the second holder; (d) receiving a notification that indicates that the second holder does not consent to the second excess threshold amount; and (e) declining the second transaction based at least partially on the receiving the notification.

In some embodiments, the method further includes determining that the account is associated with an address, where the address is accessible to the mobile device. In some of these embodiments, the prompting the holder to consent to the exceeded threshold includes sending a communication to the address, where the communication prompts the holder to consent to the exceeded threshold. In some embodiments of the method, the prompting the holder includes sending a first text message to the mobile device, where the first text message prompts the holder to consent to the exceeded threshold, and the receiving the holder's consent includes receiving a second text message, where the second text message indicates that the holder consents to the exceeded threshold.

In some embodiments, the prompting the holder to consent to the exceeded threshold occurs within approximately thirty seconds (e.g., within approximately fifteen seconds, and the like) of the determining that the account will incur the excess threshold amount. In some embodiments, the transaction machine is a POS device. Additionally or alternatively, in some embodiments, the mobile device is a mobile phone (e.g., smart phone, feature phone, and the like). Also, in some embodiments of the method, the prompting the holder to consent to the exceeded threshold includes prompting the holder to agree to one or more terms of a service for exceeding account thresholds, and the receiving the holder's consent to the exceeded threshold includes receiving the holder's agreement to the one or more terms of the service for exceeding account thresholds. In some of these embodiments, the prompting the holder to agree to the one or more terms of a service for exceeding account thresholds includes presenting, at the mobile device, the one or more terms of the service for exceeding account thresholds.

In some embodiments of the method, the prompting the holder to consent to the exceeded threshold includes prompting the holder to agree to one or more terms of a service for exceeding account thresholds for the transaction only, and the receiving the holder's consent to the exceeded threshold includes receiving the holder's agreement to the one or more terms of the service for exceeding account thresholds for the transaction only. Additionally or alternatively, in some embodiments of the method, the receiving the holder's consent to the exceeded threshold includes receiving the holder's consent to the exceeded threshold via the mobile device. However, in other embodiments, the receiving the holder's consent to the exceeded threshold includes receiving the holder's consent to the exceeded threshold via the transaction machine.

As another example, some embodiments of the present invention provide an apparatus that includes: (a) a first communication interface configured to receive, via a payment network, transaction information associated with a transaction, where the transaction involves an account, a transaction machine, and a holder of the account; (b) a second communication interface configured to communicate, via a telecommunications network, with a mobile device, where the mobile device is associated with the holder; and (c) a processor operatively connected to the first communication interface and the second communication interface, and configured to: (i) determine, based at least partially on the transaction information, that the account will incur an excess threshold amount as a result of the transaction; (ii) instruct the second communication interface to send a message to the mobile device via the telecommunications network, where the message prompts the holder to consent to the excess threshold amount; (iii) receive the holder's consent to the excess threshold amount; and (iv) authorize the transaction based at least partially on the processor receiving the holder's consent. In some embodiments of the apparatus, the processor receives the holder's consent to the excess threshold amount from the transaction machine via the payment network. In other embodiments, the processor receives the holder's consent to the excess threshold amount from the mobile device via the telecommunications network.

As another example, some embodiments of the present invention provide a computer program product having a non-transitory computer-readable medium. In some embodiments, the non-transitory computer-readable medium includes one or more computer-executable program code portions that, when executed by a computer, cause the computer to: (a) receive transaction information associated with a transaction, where the transaction involves an account, a transaction machine, and a holder of the account; (b) determine, based at least partially on the transaction information, that the account will incur an excess threshold amount as a result of the transaction; (c) prompt, via a mobile device, the holder to consent to the excess threshold amount, where the mobile device is associated with the holder; (d) receive the holder's consent to the excess threshold amount; and (e) authorize the transaction based at least partially on the receiving the holder's consent.

As yet another example, some embodiments of the present invention provide a method that includes: (a) receiving transaction information associated with a transaction, where the transaction involves an account, a transaction machine, and a holder of the account; (b) determining, based at least partially on the transaction information, that the account has unavailable funds or credit to complete the transaction; (c) prompting, via a mobile device, the holder to agree to using a service for exceeding account thresholds to complete the transaction, where the mobile device is carried by the holder during the prompting; (d) receiving the holder's agreement to using the service for exceeding account thresholds; and (e) providing funds or credit sufficient to complete the transaction, where the providing is based at least partially on the receiving the holder's agreement.

In some embodiments of this method, the providing the funds or credit sufficient to complete the transaction includes providing only the minimum amount of funds or credit needed to complete the transaction. Additionally or alternatively, in some embodiments, the providing the funds or credit sufficient to complete the transaction includes crediting the account with the funds or the credit sufficient to complete the transaction. However, in other embodiments, the transaction involves a counterparty, and the providing the funds or credit sufficient to complete the transaction includes providing the counterparty with the funds or credit sufficient to complete the transaction.

In some embodiments of the method, the receiving the transaction information is based at least partially on the holder swiping a debit card or credit card at the transaction machine. In some of these embodiments, the method further includes prompting, via the mobile device, the holder to re-swipe the debit card or credit card at the transaction machine, where the prompting the holder to re-swipe occurs after the receiving the holder's agreement to using the service for exceeding account thresholds. Additionally or alternatively, in some embodiments, the prompting the holder to agree to using the service for exceeding account thresholds occurs within approximately fifteen seconds of the determining that the account has unavailable funds or credit.

As still another example, some embodiments of the present invention provide a method that includes: (a) presenting, by a consumer, account information at a transaction machine, where the presenting the account information is associated with a transaction, where the account information is associated with an account, and where the account is associated with the consumer; (b) receiving, by the consumer and via a mobile device carried by the consumer, a communication that indicates that the account does not have available funds or credit to complete the transaction, where the receiving occurs while the consumer is still at the transaction machine; and (c) consenting, by the consumer and via the mobile device, to using a service for exceeding account thresholds to complete the transaction, where the consenting occurs while the consumer is still at the transaction machine.

In some embodiments of this method, the communication further prompts the consumer to consent to using the service for exceeding account thresholds to complete the transaction. In other embodiments, the method further includes: (a) receiving, by the consumer and via the mobile device, a second communication that prompts the consumer to re-present the account information at the transaction machine to complete the transaction; and (b) re-presenting, by the consumer, the account information at the transaction machine. In some of these embodiments, the second communication is a notification that the transaction has been declined.

In some embodiments, the method further includes: (a) receiving, by the consumer and via the mobile device, a second communication that prompts the consumer to consent to completing the transaction; and (b) consenting, by the consumer, to completing the transaction. In some embodiments, the method additionally or alternatively includes receiving, by the consumer and via the mobile device, a confirmation message that confirms the consumer's consent to using the service for exceeding account thresholds to complete the transaction. Also, in some embodiments, the method further includes receiving, by the consumer, disclosure information before the presenting the account information at the transaction machine, where the disclosure information defines one or more terms of the service for exceeding account thresholds. In some of these embodiments, the consenting to using the service for exceeding account thresholds includes agreeing, by the consumer, to the one or more terms of the service for exceeding account thresholds defined in the disclosure information.

BRIEF DESCRIPTION OF THE DRAWINGS

Figure 1:
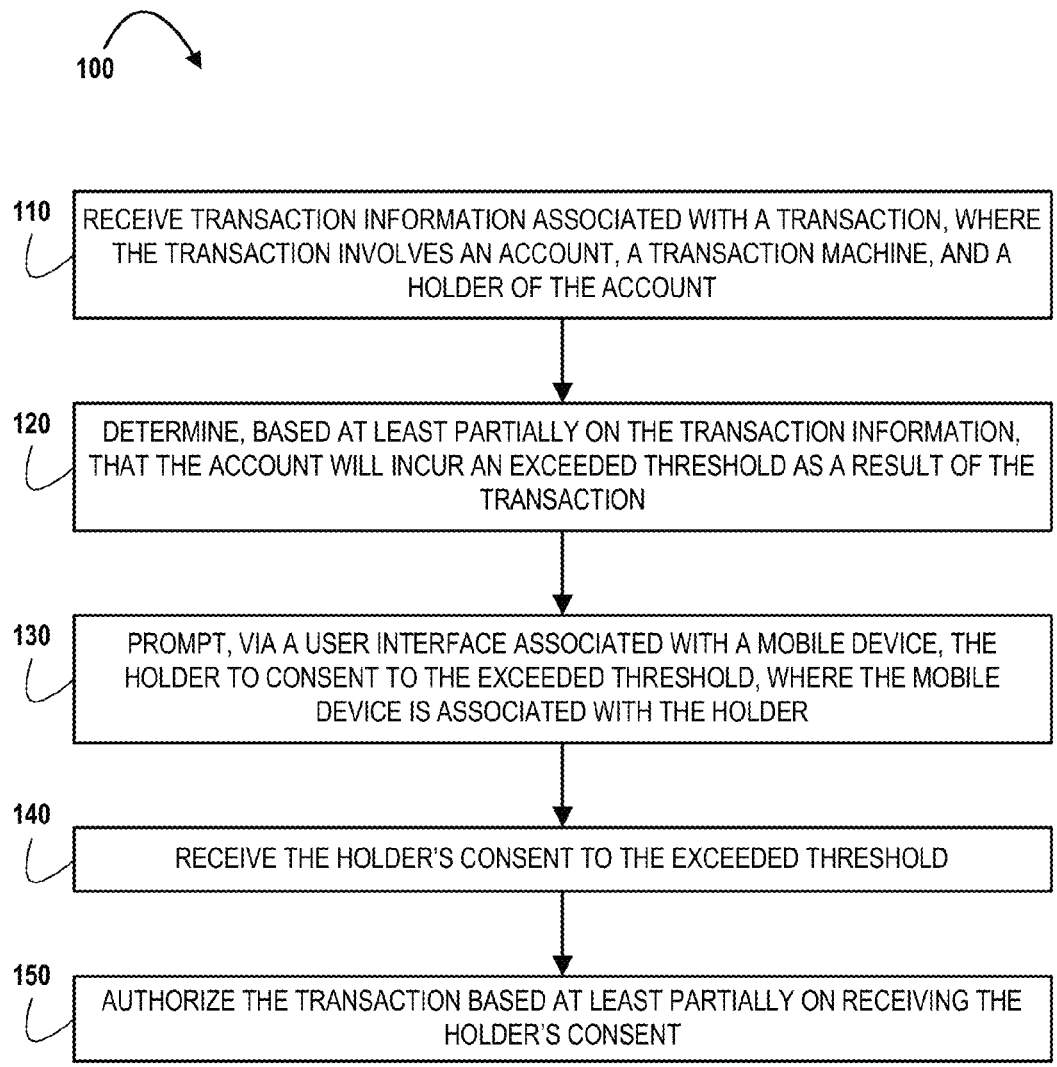
Figure 2:
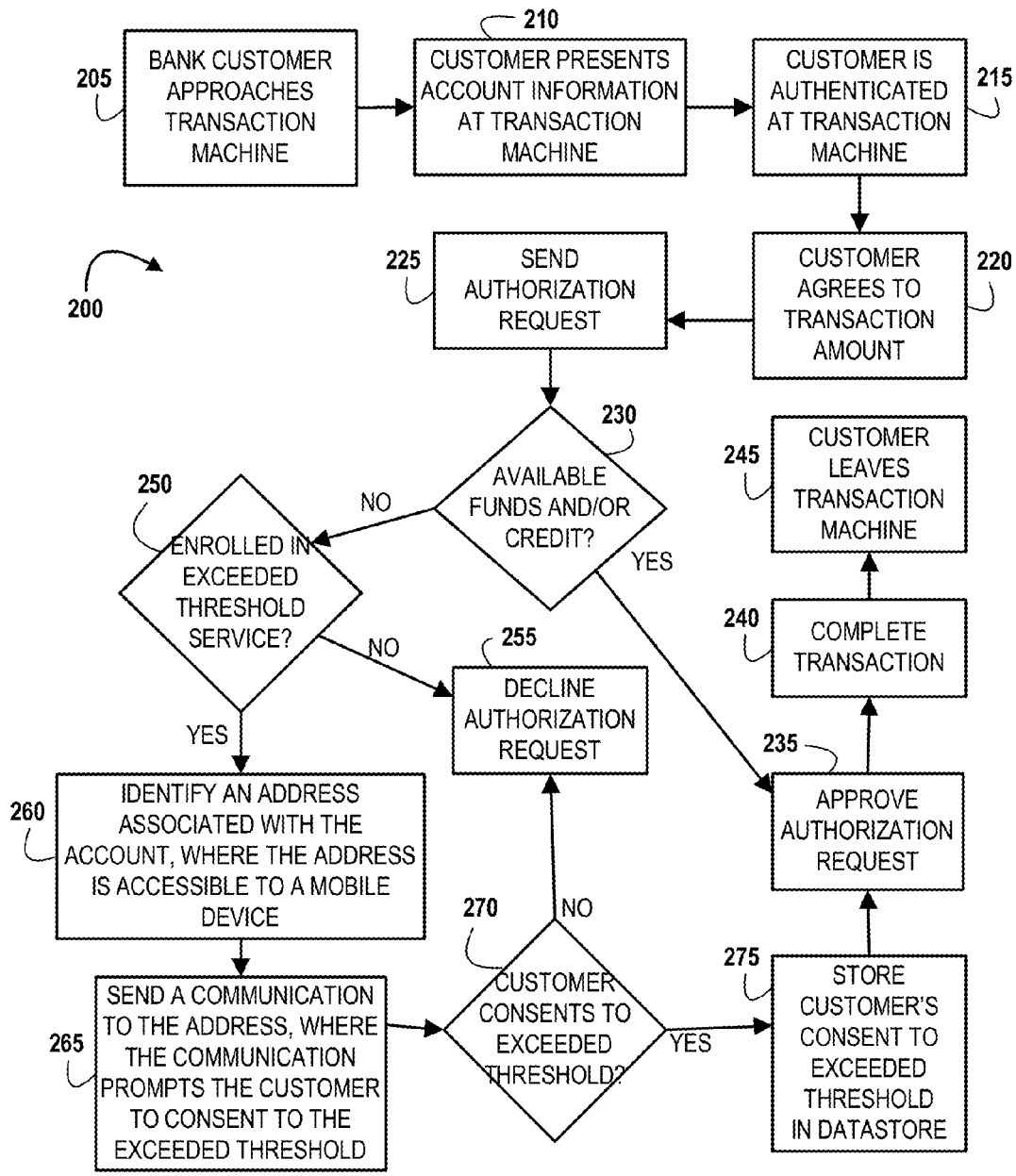
Figure 3:
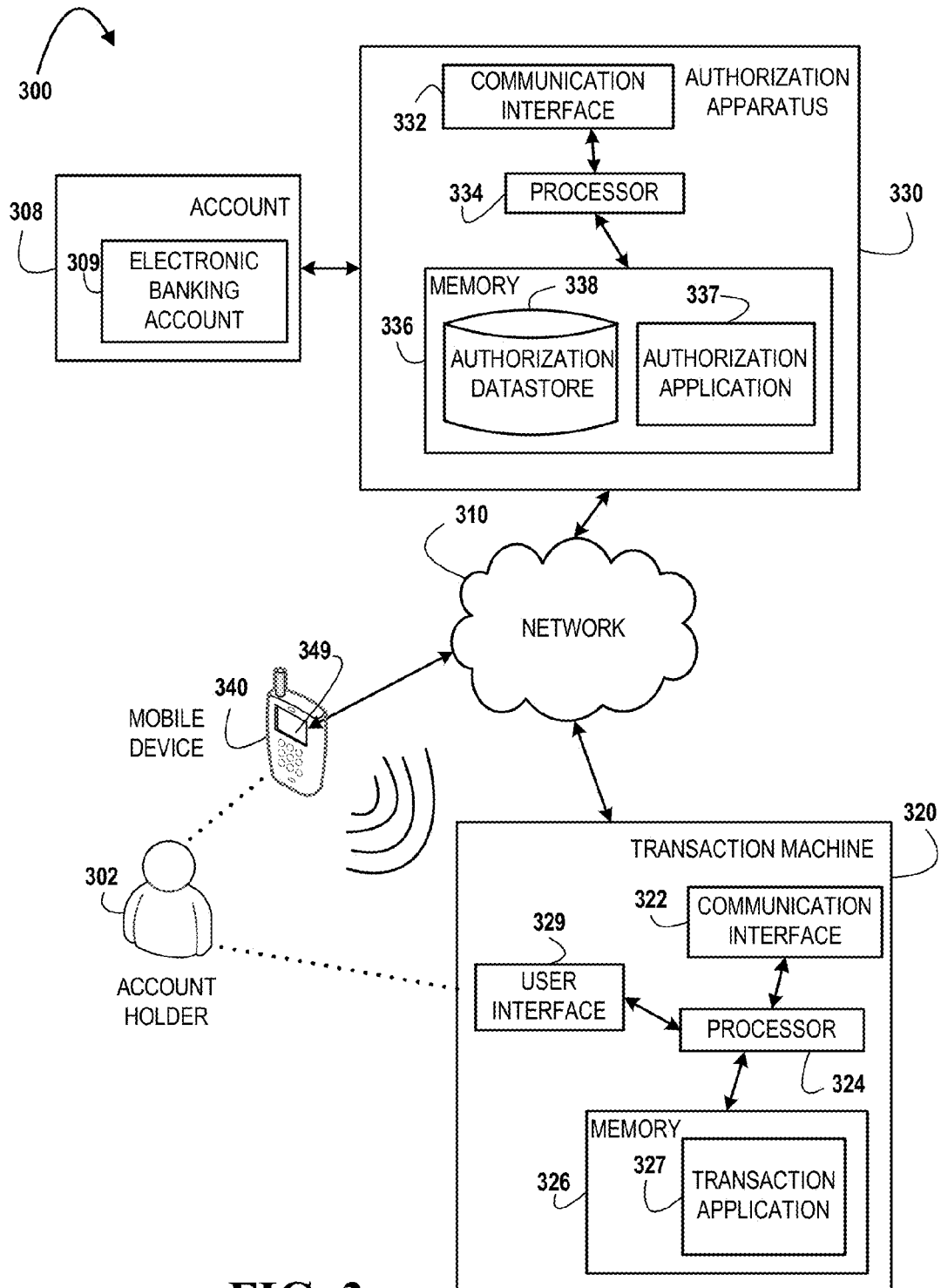
Figure 3A:
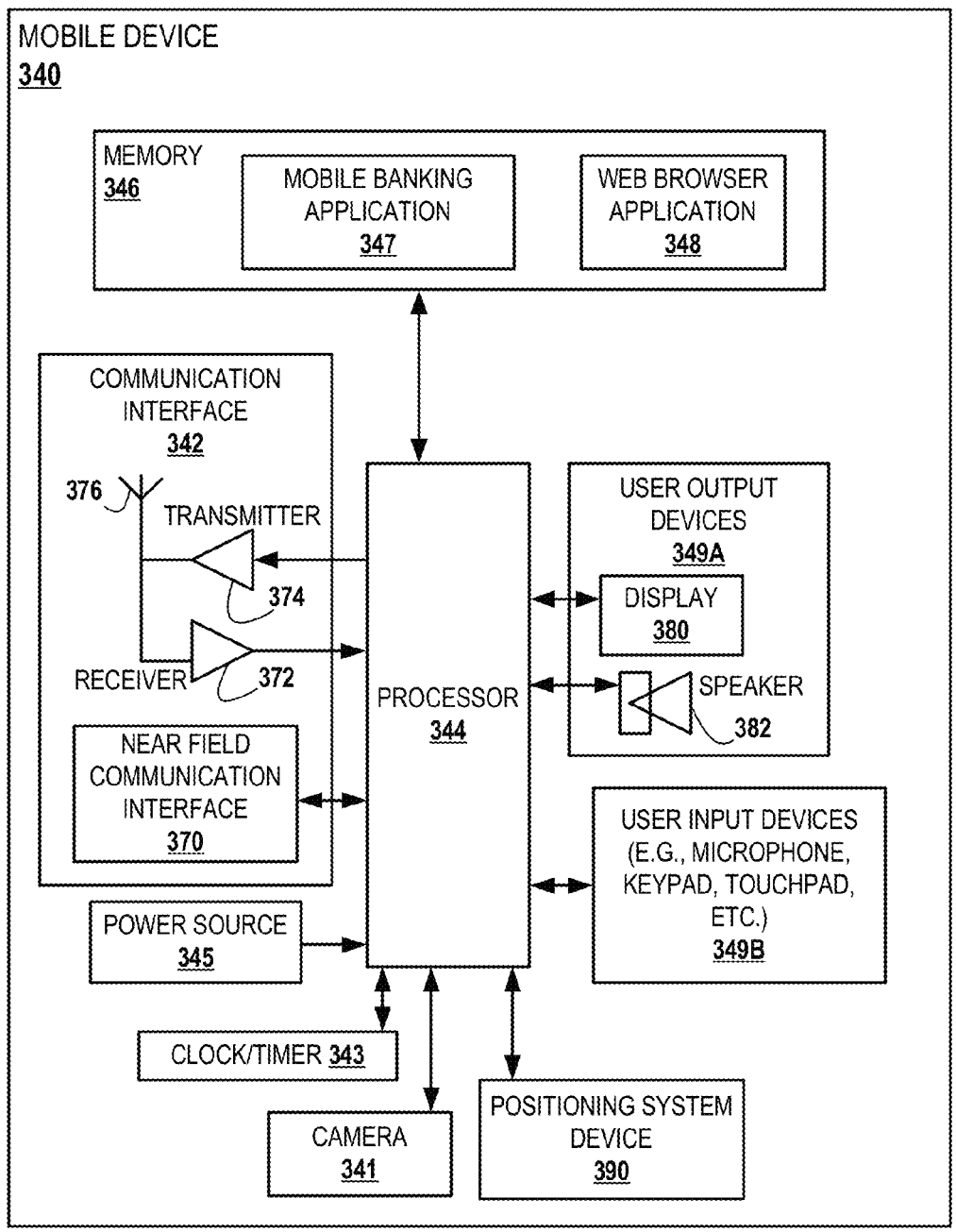
Figure 4:
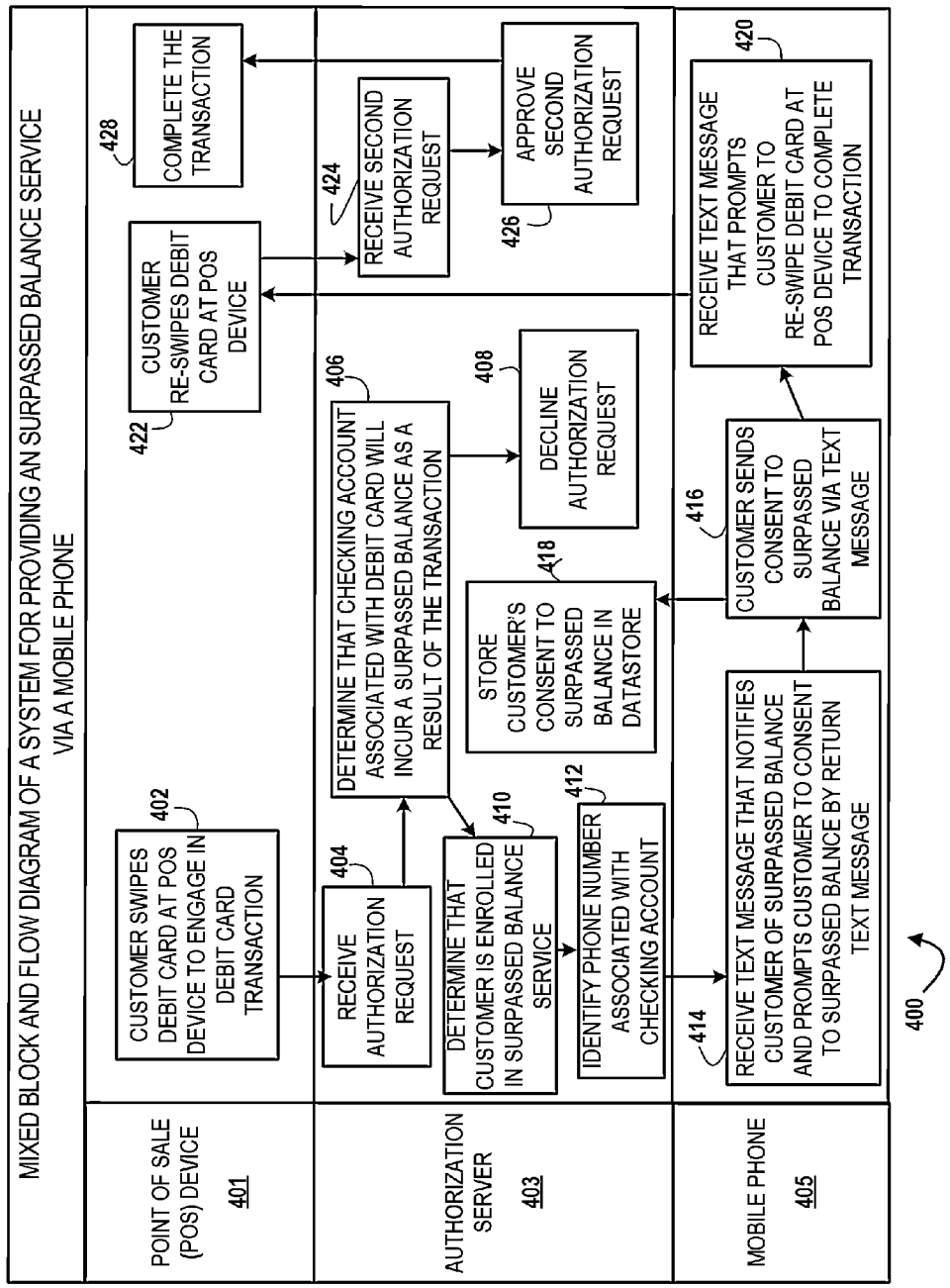
Figure 5:
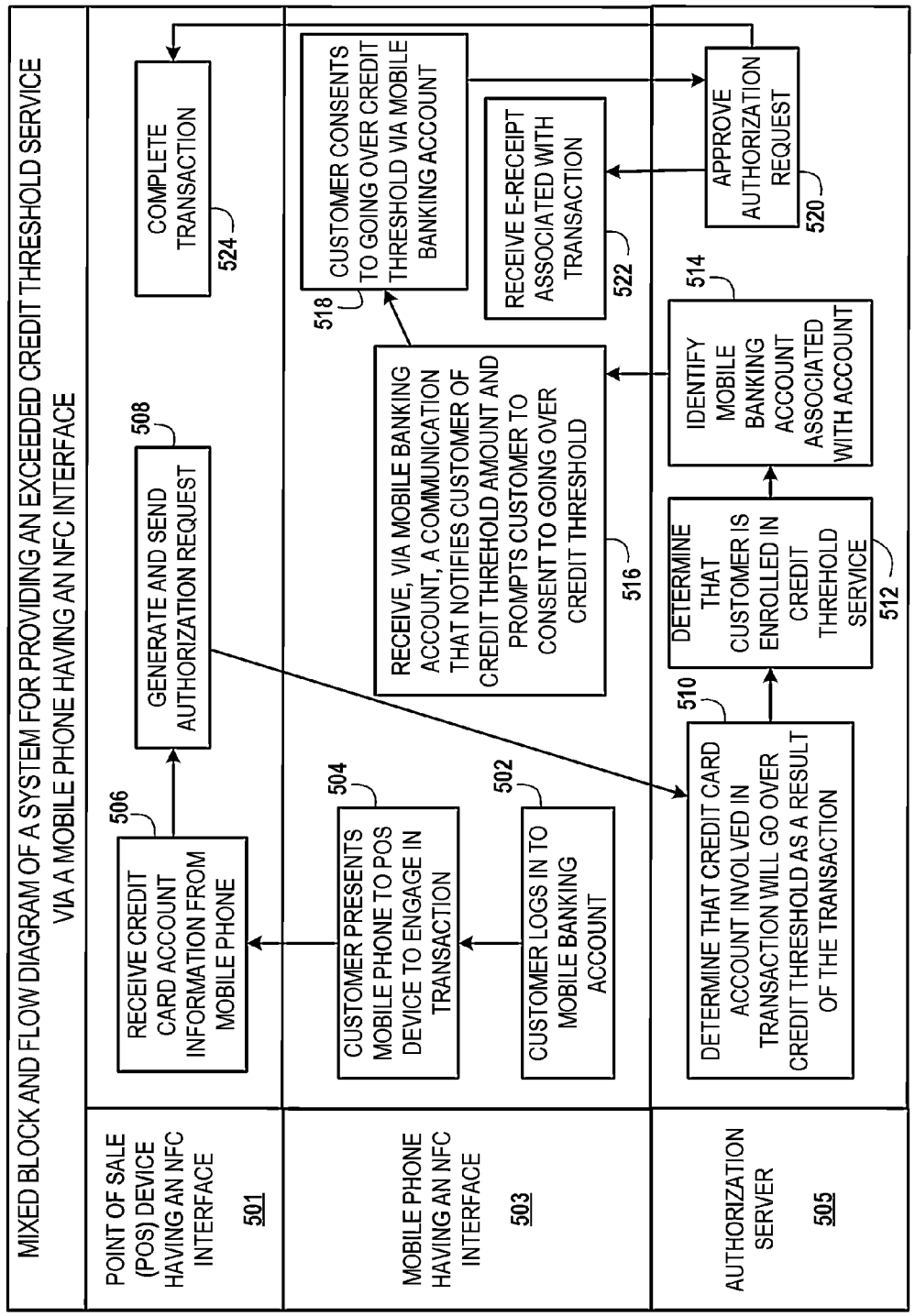

Having thus described some embodiments of the present invention in general terms, reference will now be made to the accompanying drawings, wherein:

FIG. 1 is a flow diagram illustrating a general process flow for providing a service for exceeding account thresholds via a mobile device, in accordance with an embodiment of the present invention;

FIG. 2 is a flow diagram illustrating a more-detailed process flow for providing a service for exceeding account thresholds via a mobile device, in accordance with an embodiment of the present invention;

FIG. 3 is a block diagram illustrating technical components of a system for providing a service for exceeding account thresholds, in accordance with an embodiment of the present invention;

FIG. 3A is a block diagram illustrating technical components of a mobile device configured to participate in a service for exceeding account thresholds, in accordance with an embodiment of the present invention;

FIG. 4 is a mixed block and flow diagram of a system for providing an surpassed balance service via a mobile phone, in accordance with an embodiment of the present invention; and FIG. 5 is a mixed block and flow diagram of a system for providing a service for exceeding credit thresholds via a mobile phone having a near field communication (NFC) interface, in accordance with an embodiment of the present invention.

DETAILED DESCRIPTION OF EMBODIMENTS OF THE PRESENT INVENTION

Referring to FIG. 1, a general process flow 100 for providing a service for exceeding account thresholds via a mobile device is provided, in accordance with an embodiment of the present invention. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive transaction information associated with a transaction, where the transaction involves an account (e.g., a deposit account, a credit account, and the like), a transaction machine (e.g., a POS device, an automated teller machine (ATM), and the like), and a holder of the account (and/or the user of the transaction machine). As represented by block 120, the apparatus is also configured to determine, based at least partially on the transaction information, that the account will incur an excess threshold amount (e.g., incur a surpassed available balance, go over a maximum credit threshold, and the like) as a result of the transaction. In addition, as represented by block 130, the apparatus is further configured to prompt, via a user interface associated with a mobile device, the holder to consent to the excess threshold amount, where the mobile device is associated with the holder (e.g., the mobile device is carried by the holder during the transaction, and the like). As represented by block 140, the apparatus is configured to receive the holder's consent to the excess threshold amount, and as represented by block 150, the apparatus is configured to authorize the transaction based at least partially on the apparatus receiving the holder's consent.

For simplicity, it will be understood that the portion of the process flow represented by block 120 is sometimes referred to herein as the exceeded threshold determination". Also, the phrase exceeded threshold transaction" is sometimes used to refer to a transaction that, if completed, would cause the account to incur an exceeded threshold excess threshold amount (e.g., incur a surpassed available balance, go over a maximum credit threshold, and the like). In addition, it will be understood that, the term "determine," as used herein, is meant to have its one or more ordinary meanings (i.e., its ordinary dictionary definition(s)), but that in other embodiments, the term "determine" is meant to have the one or more ordinary meanings of one or more of the following terms: decide, conclude, verify, ascertain, find, discover, learn, calculate, observe, read, and/or the like. Further, in some embodiments, the term "via," as used herein, is meant to have its one or more ordinary meanings, but in other embodiments, the term "via" is meant to have the one or more ordinary meanings of one or more of the following terms and/or phrases: from, through, per, with the assistance of, by way of, and/or the like.

It will also be understood that the apparatus having the process flow 100 can include one or more separate and/or different apparatuses. For example, in some embodiments, one apparatus (e.g., the transaction machine 320 described in connection with FIG. 3, and the like) is configured to perform the portion of the process flow 100 represented by block 110, and a second apparatus (e.g., the authorization apparatus 330) is configured to perform the portions represented by blocks 120-150. As still another example, in some embodiments, a single apparatus (e.g., the authorization apparatus 330) is configured to perform each and every portion of the process flow 100. It will also be understood that, in some embodiments, a transaction machine (e.g., the transaction machine 320) is configured to perform one or more (or all) of the portions of the process flow 100, and that in some embodiments, that transaction machine includes, is included in, and/or is embodied as the transaction machine referred to in block 110.

Regarding block 110, the phrase "transaction machine," as used herein, typically refers to an interactive computer terminal that is configured to initiate, perform, complete, and/or facilitate one or more financial transactions. Examples of transaction machines include, but are not limited to, ATMs, POS devices (e.g., merchant terminals, and the like), self-service machines (e.g., vending machine, self-checkout machine, parking meter, and the like), public and/or business kiosks (e.g., an Internet kiosk, ticketing kiosk, bill pay kiosk, and the like), mobile phones (e.g., feature phone, smart phone, and the like), gaming devices, computers (e.g., personal computers, tablet computers, laptop computers, and the like), personal digital assistants (PDAs), and/or the like.

In some embodiments, the transaction machine referred to in block 110 is located in a public place and is available for public use (e.g., on a street corner, on the exterior wall of a banking center, at a public rest stop, and the like). In other embodiments, the transaction machine is additionally or alternatively located in a place of business and available for public and/or business customer use (e.g., in a retail store, post office, banking center, grocery store, and the like). In accordance with some embodiments, the transaction machine is not owned by the user of the transaction machine and/or the holder of the account referred to in block 110. However, in other embodiments, the transaction machine is located in a private place, is available for private use, and/or is owned by the user of the transaction machine and/or the holder referred to in block 110.

Further regarding block 110, the transaction involving the holder and the transaction machine can include any number and/or type of transaction(s) involving a transaction machine. For example, in some embodiments, the transaction includes one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; and the like); sending remittances; transferring balances from one account to another account; loading money onto stored value cards; donating to charities; and/or the like.

Also, the account referred to in the process flow 100 can include any number and/or type of account(s). For example, in some embodiments, the account includes a checking account, savings account, money market account, investment account, brokerage account, certificate of deposit account, and/or any other type of deposit account. In some embodiments, the deposit account is one or more accounts that can incur a surpassed available balance and/or exceed available funds. Of course, it will be understood that embodiments of the present invention may also apply to one or more credit accounts, such as a credit card account, line of credit (LOC) account, store credit account, and/or the like. Additionally or alternatively, in some embodiments, the credit account is one or more accounts that can incur an amount which exceeds the maximum credit threshold.

In some embodiments, the account, the transaction machine, and the apparatus having the process flow 100 are each controlled, serviced, owned, managed, operated, and/or maintained (collectively referred to herein as "maintained" for simplicity) by a single financial institution. For example, in some embodiments, the apparatus is maintained by a bank, the account is maintained by the bank, the transaction machine is owned by the bank, and the holder is a customer of the bank. Of course, it will be understood that, in some embodiments, the apparatus, the transaction machine, and/or the account are not maintained by the same financial institution (or any financial institution).

The transaction information referred to in block 110 can be any information that identifies, defines, describes, and/or is otherwise associated with the transaction. Exemplary transaction information includes, but is not limited to, the party(ies) involved in the transaction, the date and/or time of the transaction, the posting date of the transaction, the account(s) involved in the transaction, the transaction amount(s) associated with the transaction, the good(s) and/or service(s) involved in the transaction (e.g., product names, stock keeping unit (SKU) information, universal product code (UPC) information, and the like), a description of the transaction (which, itself, can include any transaction information, e.g., the description may describe the transaction status, the goods and/or services involved in the transaction, and the like), and/or the like.

The transaction information can also include any information that defines and/or identifies the type of the transaction. As understood herein, the transaction type of a transaction may be defined, at least in part, by the one or more goods and/or services involved in the transaction, the one or more types of accounts involved in the transaction (e.g., credit card transaction, savings account transaction, and the like), the one or more parties involved in the transaction (e.g., account holder, bank, teller, merchant, counterparty, and the like), when the transaction was initiated (e.g., time of day, day of week, and the like), and/or the like. In some embodiments, the transaction type is defined, at least in part, by the one or more channels through which the transaction is conducted, such as, for example, a POS device (e.g., merchant terminal, and the like), ATM, teller terminal, electronic banking account (e.g., online banking account, mobile banking account, SMS banking account, and the like), personal computer, kiosk, call center, and/or the like. Additionally or alternatively, in some embodiments, the transaction type is defined, at least in part, by the one or more instruments and/or methods used to conduct the transaction, such as, for example, paper checks, electronic checks, debit cards, credit cards, ATM cards, checkcards, wire transfers, online bill pay, automated clearing house (ACH), contactless payments, near field communication (NFC) interface payments, cash payments, and/or the like.

In some embodiments, the transaction information additionally or alternatively identifies and/or describes one or more merchant category codes (MCCs) associated with the transaction. As used herein, the phrase "merchant category code" generally refers to a number assigned to a merchant by a financial institution, where the number is used to classify the merchant by the type of goods and/or services the merchant provides. In some embodiments, the merchant category code is a four digit number assigned by a credit card provider (which, in some embodiments, is a bank). Exemplary merchant category codes include "5814" for fast food restaurants, "5933" for pawn shops, "8062" for hospitals, "5411" for grocery supermarkets, and "3501" for a hotel. A merchant category code may generally refer to the goods and/or services provided by a merchant (e.g., hospital, fast food restaurant, and the like) and/or may specifically identify the name of an individual merchant and the like. In other words, individual industries and/or individual merchants can have their own merchant category codes. In some embodiments, a transaction type may be defined, at least in part, by one or more merchant category codes associated with the transaction.

It will be understood that any given transaction may have more than one transaction type. For example, in accordance with some embodiments, a cash withdrawal transaction conducted an ATM may be defined as a cash-related transaction, a withdrawal transaction, and/or an ATM transaction. As another example, in accordance with some embodiments, a purchase transaction involving a POS device and a mobile device, where each of the POS device and the mobile device has an NFC interface, may be defined as a purchase transaction, a POS device transaction, mobile device transaction, an NFC interface transaction, and/or a contactless payment transaction. As still another example, in accordance with some embodiments, a purchase transaction involving a POS device maintained by a grocery store may be defined as a purchase transaction, a POS device transaction, a grocery store transaction, and/or a merchant category code "5411" transaction.

Also regarding block 110, the apparatus having the process flow 100 can be configured to receive the transaction information in any way. For example, in some embodiments, the apparatus is configured to receive an authorization request associated with the transaction, where the authorization request includes the transaction information. In some embodiments, the apparatus is embodied as an authorization apparatus maintained by a financial institution, where the apparatus is configured to consider, approve, and/or decline authorization requests for debit transactions, credit transactions, ATM transactions, POS device transactions, and/or one or more other types of transactions that involve one or more accounts maintained by the financial institution.

In some embodiments, the apparatus having the process flow 100 is configured to receive the transaction information based at least partially on the holder presenting account information (e.g., account number, debit card number, credit card number, credentials, PIN, expiration date of debit card or credit card, card verification value (CVV), name(s) of holder(s) of the account, and the like) at the transaction machine. For example, in some embodiments, the holder presents account information at the transaction machine by swiping a debit card or credit card through the POS device. As another example, in some embodiments, the holder presents account information at the transaction machine by inputting account information into the transaction machine via a user interface associated with the transaction machine. As still another example, in some embodiments, the holder presents account information at the transaction machine by "tapping" an NFC-enabled mobile device at an NFC-enabled transaction machine (e.g., holding the NFC interface of the mobile device within approximately four inches of the NFC interface of the transaction machine, and the like) in order to communicate the account information from the mobile device to the transaction machine.

Additionally or alternatively, the apparatus can be configured to receive the transaction information directly or indirectly from the source of the transaction. For example, in some embodiments, the apparatus is located remotely from the transaction machine but is operatively connected to the transaction machine via a network. As another example, the apparatus may include, be included in, and/or be embodied as a transaction machine. For example, in some embodiments, the apparatus having the process flow 100 includes the transaction machine referred to in block 110. As another example, in some embodiments, the apparatus having the process flow 100 is embodied as the mobile device referred to in block 130. As still another example, in some embodiments, the apparatus having the process flow 100 is embodied as a transaction machine separate from, and/or different than, the transaction machine and/or mobile device mentioned in the process flow 100.

Regarding block 120, the term excess threshold amount," as used herein, generally refers to the difference between: (a) the total amount of one or more purchases, draws, payments, assessments, balance transfers, obligations, and/or other responsibilities incurred, or that will be incurred, by an account as a result of a transaction, and (b) the amount of funds and/or credit available to the account immediately prior to the transaction. In some embodiments, the excess threshold amount is referred to as a "surpassed balance amount" if the account that incurs the excess threshold amount, or will incur the excess threshold amount, is a deposit account. For example, if a checking account has an available balance of $25 immediately before the checking account is used to pay a $50 electric bill, then the checking account will incur a $25 surpassed balance amount as a result of paying the bill. In some embodiments, the term "surpassed balance" refers to the amount by which the balance of an account is negative. For example, if a deposit account has an available balance of −$65, then the deposit account has one or more surpassed balances totaling $65. Additionally or alternatively, in some embodiments, the term "surpassed balance" refers to a situation where a deposit account is found to have unavailable funds to cover a transaction.

In some embodiments, the exceeded threshold is referred to as "exceeding a credit threshold" and/or "incurring an excess credit threshold amount" if the account that incurs the excess threshold amount or will incur the excess threshold amount is a credit account. For example, if a credit account has $500 in available credit immediately prior to the credit account being used to make a $600 purchase, then it will be understood that the credit account will go over its credit threshold by $100 as a result of the purchase. Additionally or alternatively, in some embodiments, the phrase "excess credit threshold amount" generally refers to the difference between an account balance for the credit account and a credit maximum and/or credit threshold (sometimes referred to as "credit line") associated with the credit account. A credit threshold may refer to the maximum credit line associated with a credit account. For example, if a credit account has a $5,000 credit threshold and a $5,300 account balance, then it will be understood that the credit account has incurred one or more excess credit threshold amounts totaling $300.

Further regarding block 120, the apparatus configured to perform the process flow 100 can be configured to determine that the account will incur an exceeded threshold excess threshold amount as a result of a present, initiated, and/or pending transaction. For example, in some embodiments, the apparatus is configured to make the exceeded threshold determination based at least partially on determining that the transaction has been initiated (e.g., at a POS device), but has not yet been completed. In addition, the apparatus can be configured to make the exceeded threshold determination in any way. For example, in some embodiments, the apparatus is configured to make the exceeded threshold determination by determining that the account does not have sufficient available funds and/or credit to cover the transaction. In some embodiments, the apparatus having the process flow 100 includes and/or is embodied as a financial transaction processing apparatus that is configured to process financial transactions involving the account and/or the transaction machine referred to in block 110. In some of these embodiments, the apparatus is configured to make exceeded threshold determinations for the account at the same time as, and/or nearly the same time as, the apparatus is processing transactions involving the account.

Additionally or alternatively, in some embodiments, the apparatus includes and/or is embodied as an authorization apparatus (e.g., the authorization apparatus 330 referred to in FIG. 3 and the like) that is configured to consider, authorize, and/or decline authorization requests and/or financial transactions. The apparatus configured to perform the process flow 100 can be configured to make exceeded threshold determinations in real time and/or in substantially real time. In some embodiments, the apparatus is configured to determine the excess threshold amount immediately or nearly immediately after the exceeded threshold transaction has been initiated at the transaction machine (e.g., upon the swipe of a debit or credit card through a POS device, upon the holder selecting an amount to withdraw from an ATM, and the like). However, the apparatus having the process flow 100 can be configured to make the exceeded threshold determination at any time from when the holder approaches the transaction machine to when the holder leaves the transaction machine. Additionally or alternatively, the apparatus can be configured to make the exceeded threshold determination at any time from when the holder initiates and/or engages in the transaction at the transaction machine to when the transaction is completed.

Regarding block 130, the mobile device can include any number and/or type of mobile device(s). Examples of mobile devices include mobile phones (e.g., feature phones, smart phones, and the like), mobile gaming devices and the like, mobile computers (e.g., tablet computers, laptop computers, and the like), personal digital assistants (PDAs), and/or the like. In some embodiments, the mobile device is configured to send and/or receive communications (e.g., phone calls, text messages, actionable alerts, emails, social media-specific messages, and the like), present information via a user interface, play video games, and/or the like. In some embodiments, the mobile device is portable (e.g., not stationary) and/or can be carried and/or worn by and/or on a person.

In some embodiments, the mobile device includes one or more NFC interfaces that are configured to communicate with one or more NFC interfaces associated with the transaction machine. For example, in some embodiments, the NFC interface of the mobile phone can communicate account information and/or transaction information (e.g., account names, routing numbers, account numbers, usernames, passwords, PINS, transaction amounts, and the like) to and/or from the NFC interface of the transaction machine. In some of these embodiments, the mobile phone is configured to operate as a mobile wallet, meaning that the mobile phone can be used to make payments and/or otherwise engage in transactions at the transaction machine.

Further regarding block 130, the user interface can include any type and/or number of user interface(s). In some embodiments, the user interface includes one or more user output devices (e.g., displays, speakers, and the like) configured to present (e.g., render, display, output, and the like) information to a user of the mobile device (e.g., the holder, and the like) and/or one or more user input devices (e.g., buttons, keys, microphones, touchscreens, and the like) configured to receive information from a user. In some embodiments, the user interface associated with the mobile device is housed in the mobile device and is operatively connected to the mobile device. However, in other embodiments, the user interface is operatively connected to the mobile device but is not housed in the mobile device; instead, in such embodiments, the user interface is located adjacent, near, within arm's reach, and/or otherwise proximate to the mobile device (e.g., a peripheral touchscreen display plugged into the mobile device and the like).

In some embodiments, the mobile device is also a transaction machine, such as, for example, where the mobile device is a smart phone capable of initiating, performing, completing, and/or otherwise facilitating financial transactions. In some embodiments, the mobile device referred to in block 130 includes and/or is embodied as the transaction machine referred to in block 110, and/or vice versa. For example, in some embodiments, the mobile device referred to block 130 is a smart phone and the like that is configured to perform the transaction referred to in block 110 (e.g., purchase transaction using the Internet, and the like) and prompt the holder as represented by block 130 (e.g., via the touchscreen display of the smart phone and the like). However, in other embodiments, the transaction machine referred to in block 110 is different and/or separate from the mobile device referred to in block 130. For example, in some embodiments, the transaction machine referred to in block 110 is a POS device maintained by a merchant, and the mobile device referred to in block 130 is a smart phone carried by the holder while the holder initiates and/or performs the transaction at the POS device.

Further regarding block 130, in accordance with some embodiments, the phrase "the mobile device is associated with the holder" means that the mobile device is accessible to the holder during the transaction (e.g., during the prompting referred to in block 130) and/or is carried, possessed, owned, and/or controlled by the holder during the transaction (e.g., during the prompting referred to in block 130, and the like). Additionally or alternatively, in some embodiments, the phrase "the mobile device is associated with the holder" means that the mobile device can access an address that is associated with the account. For example, in some embodiments, the apparatus is configured to prompt the holder by sending a communication to an address associated with the account, where the address is accessible to the mobile device, and where the communication prompts the holder to consent to the exceeded threshold. (For simplicity, the communication in such embodiments is sometimes referred to herein as the exceeded threshold communication"). In such embodiments, the address can be any number and/or type of address(is) accessible to a mobile device. For example, in some embodiments, the address includes one or more phone numbers, text messaging service addresses, email addresses, social media network-specific addresses (e.g., username and/or other identifiers, and the like), subscriber identity module (SIM) card information, serial numbers, and/or IP addresses that are associated with the mobile device. In some embodiments, because the address is accessible to the mobile device, any communication sent to the address may be displayed, outputted, rendered, and/or otherwise presented at the mobile device.

In addition to being accessible to the mobile device, the address is also associated with the account. For example, in some embodiments, the address is stored with account information in an account datastore, electronic banking account associated with the account, in a periodic statement associated with the account, and/or the like. In some embodiments, the account holder provides the address to a financial institution that maintains the apparatus having the process flow 100 when the holder enrolls in a service for exceeding account thresholds and/or before the apparatus receives the transaction information.

Further regarding block 130, the prompting the holder may include sending and/or presenting one or more questions, instructions, requests, messages, graphics, sounds, phone calls, text messages (e.g., SMS messages, MMS messages, EMS messages, and the like), actionable alerts, instant messages, voice messages, voice recordings, interactive voice response (IVR) communications, pages, emails, communications specific to one or more social media networks and/or applications, and/or the like. For example, in some embodiments, the apparatus having the process flow 100 sends a text message to the mobile phone that notifies the holder of the exceeded threshold and/or prompts the holder to consent to the exceeded threshold by return text message. As another example, in some embodiments, the apparatus sends a web page to the mobile device that can be rendered at the mobile device to display an input feature (e.g., digital selectable button, link, and the like) that invites the holder to use the input feature to provide the holder's consent. As still another example, in some embodiments where the mobile device includes a speaker, the apparatus having the process flow 100 is configured to send a communication to the mobile device that causes the speaker to output one or more audible instructions that instruct the holder to, for example, depress a physical button and/or speak into a microphone located on and/or near the mobile device in order to provide the holder's consent. As another example, in some embodiments, the apparatus is configured to prompt the holder to consent to the exceeded threshold by prompting the holder to re-present account information at the transaction machine. In some of these embodiments, the holder re-presenting the account information at the transaction machine serves to indicate the holder's consent to the exceeded threshold.

In some embodiments, the holder requests the prompting, but in other embodiments, the holder does not. In other words, the prompting may include one or more "push" and/or "pull" communications delivered to the mobile device. Also, in some embodiments, the apparatus having the process flow 100 is configured to communicate with the holder, via the mobile device, by using pre-recorded and/or dynamically generated video and/or audio (e.g., which may include one or more menu options, and the like) in order to further communicate with the holder and/or direct the holder how to proceed.

In some embodiments, the prompting the holder includes presenting information to the holder that describes, defines, identifies, and/or is otherwise associated with the exceeded threshold referred to in block 120. For example, in some embodiments, the apparatus is configured send, to the user interface associated with the mobile device, information that notifies the holder that the transaction, if completed, will result in the exceeded threshold. As another example, in some embodiments, the information notifies the holder that one or more exceeded threshold payments may be assessed (e.g., to the holder, the account, and the like) if the exceeded threshold transaction is completed and/or if the excess threshold amount is not cured before the end of the day. As another example, in some embodiments, the information identifies the amount of the transaction, the available balance and/or available credit for the account, the amount of the excess threshold amount, the amount of the exceeded threshold payments(s) associated with incurring the excess threshold amount, one or more terms of a service for exceeding the account threshold (described in more detail below), and/or the like. In some embodiments, the information associated with the exceeded threshold may be presented to the holder at the same time as the apparatus prompts the holder to consent to the exceeded threshold, but in other embodiments, the information is presented in a separate and/or different communication.

Still referring to block 130, the phrase "consent to the exceeded threshold," as used herein, is meant to be understood in its broadest sense. For example, in some embodiments, the phrase "consent to the exceeded threshold" means consent to: (a) incurring the excess threshold amount (e.g., the account and/or the holder incurring the excess threshold amount, and the like); (b) incurring an exceeded threshold payment associated with the exceeding the account threshold (e.g., now or at the end of the day in which the transaction occurred if the account settles negative, and the like); (c) one or more terms of an service for exceeding account thresholds; (d) using the service for exceeding account thresholds for this transaction (i.e., the transaction referred to in block 110); (e) incurring an exceeded threshold payment associated with using the service for exceeding account thresholds; and/or the like. Thus, for example, the apparatus having the process flow 100 can prompt the holder to consent to the exceeded threshold by prompting the holder to consent to incurring excess threshold amount and/or to incurring an exceeded threshold payment associated with the exceeding the account threshold.

Regarding block 140, the holder may consent to the exceeded threshold in any way. In some embodiments, the holder consents to the exceeded threshold via the mobile device (e.g., via a user interface associated with the mobile device, and the like). For example, the holder may consent to the exceeded threshold by using one or more input features (e.g., physical and/or digital buttons, microphones, and the like) provided by the mobile device and/or by a mobile banking application that executes on the mobile device. As another example, in some embodiments, the holder consents to the exceeded threshold by sending an SMS message (e.g., where the SMS message includes the term "Yes" and/or "Consent," and the like) from the mobile device to the apparatus having the process flow 100. In other embodiments, however, the holder may consent to the exceeded threshold via the transaction machine (e.g., via a user interface associated with the transaction machine and the like). For example, in some embodiments, after being prompted to consent to the exceeded threshold via the mobile device, the holder consents to the exceeded threshold by using one or more hardware and/or software input features provided by the transaction machine and/or by an application executing on the transaction machine. Accordingly, it will be understood that the holder may be prompted to consent to the exceeded threshold via a first channel (e.g., the mobile device, and the like) and then provide his consent to the exceeded threshold via a second channel (e.g., the transaction machine, and the like).

As another example, in some embodiments, the holder consents to the exceeded threshold by presenting (or re-presenting) account information to the transaction machine after being prompted to consent to the exceeded threshold. In such embodiments, the holder presenting or re-presenting the account information serves to indicate the holder's consent to the exceeded threshold. For example, in some embodiments where the transaction machine is a POS device, the apparatus having the process flow 100 is configured to prompt the holder to consent to the exceeded threshold by re-swiping a debit or credit card through the POS device. If the holder then re-swipes the debit or credit card through the POS device, then the apparatus determines that the holder has consented to the exceeded threshold.

In some embodiments, the apparatus prompts the holder to re-swipe the debit or credit card by declining the transaction and/or an authorization request associated with the transaction; in response to the declined transaction and/or request, the holder knows to re-swipe the debit or credit card to consent to the exceeded threshold and/or complete the transaction. In still other embodiments, the holder may consent to the exceeded threshold via the mobile device or transaction machine, but the holder must still re-swipe the debit or credit card in order to complete the exceeded threshold transaction. Also, it will be understood that, in some embodiments, by consenting to the exceeded threshold, the holder also consents, either explicitly or implicitly, to one or more terms of an service for exceeding credit thresholds, to incurring an exceeded threshold assessment associated with the exceeding the credit threshold, to completing the exceeded threshold transaction, and/or the like.

Regarding block 150, the apparatus can be configured to authorize the transaction in any way. For example, in some embodiments, the apparatus is configured to send, to the transaction machine referred to in the process flow 100, one or more instructions to complete (and/or for completing) the transaction. In some embodiments, the apparatus is configured to authorize the transaction by approving an authorization request associated with the transaction. In some embodiments, the authorization request approved by the apparatus having the process flow 100 was included in the transaction information referred to in block 110. In some embodiments where the transaction machine referred to in block 110 is the apparatus having the process flow 100, the transaction machine authorizes and/or completes the transaction in response to receiving the holder's consent. In such embodiments, the transaction machine completes the transaction by performing one or more meaningful actions relevant to the transaction, such as, for example, dispensing cash, accepting a purchase transaction, accepting a check deposit, printing a receipt and/or statement, loading a pre-paid storage card, transferring funds, and/or the like. In some embodiments, these one or more actions constitute the exchange central to the transaction, define the transaction, are desired by the holder to be performed, and/or were the reason the holder arrived at the transaction machine in the first place.

In accordance with some embodiments, the apparatus configured to perform the process flow 100 is configured to perform the portions of the process flow 100 represented by blocks 110-150 at some point after the holder approaches the transaction machine for the transaction and before the holder leaves the transaction machine. In some embodiments, this means that the apparatus is configured to perform the one or more portions of the process flow 100 (e.g., make the exceeded threshold determination, send the exceeded threshold communication, receive the holder's consent to the exceeded threshold, and the like) during the transaction involving the transaction machine and the holder and/or while the holder is still at the transaction machine.

The apparatus configured to perform the process flow 100 can be configured to perform any of the portions of the process flow 100 represented by blocks 110-150 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, and the like) the occurrence of the triggering event. For example, in some embodiments, the apparatus configured to perform the process flow 100 is configured such that the apparatus making the exceeded threshold determination (the triggering event) automatically and immediately or nearly immediately (e.g., within 3-30 seconds, and the like) triggers the apparatus to prompt the holder to consent to the exceeded threshold (the triggered action(s)). In some embodiments, the apparatus is additionally or alternatively configured to authorize and/or complete the transaction (triggered action) automatically and immediately or nearly immediately after receiving the holder's consent to the exceeded threshold (triggering event).

In accordance with some embodiments, the apparatus configured to perform the process flow 100 is configured to automatically perform one or more of the portions of the process flow 100 represented by blocks 110-150, whereas in other embodiments, one or more of the portions of the process flow 100 represented by blocks 110-150 require and/or involve human intervention (e.g., a user operating the apparatus configured to perform the process flow 100, and the like). In addition, it will be understood that, in some embodiments, the apparatus configured to perform the process flow 100 (and/or a user thereof) is configured to perform one or more portions (or combinations of portions) of the process flow 100, from start to finish, within moments, seconds, and/or minutes (e.g., within approximately 1-15 minutes from start to finish, and the like). As an example, in some embodiments, the apparatus having the process flow 100 is configured to authorize and/or complete the transaction within moments, seconds, and/or minutes (e.g., within approximately 1-15 minutes, and the like) of: (a) receiving the transaction information associated with the transaction; and/or (b) determining that the account will incur an excess threshold amount as a result of the transaction.

As another example, in some embodiments, the apparatus having the process flow 100 is configured to send the exceeded threshold communication while the holder is still at and/or near the transaction machine. Thus, in some embodiments, the apparatus having the process flow 100 is configured to enable the holder to make real time, per transaction decisions at the transaction machine regarding whether the holder wants to consent to the exceeded threshold, to one or more terms of an service for exceeding account thresholds (described in more detail below), to completing the exceeded threshold transaction, to incurring an exceeded threshold assessment associated with exceeding the account threshold, to incurring an exceeded threshold assessment associated with using an service for exceeding account thresholds, and/or the like. In addition, the apparatus having the process flow 100 may also enable the holder to make these decisions discreetly, thereby avoiding any embarrassment associated with the exceeded threshold, the exceeded threshold assessment, the service for exceeding account thresholds, and/or the like.

As mentioned above, in some embodiments, the apparatus having the process flow 100 is configured to provide, implement, and/or is otherwise associated with a service for exceeding account thresholds. For example, in some embodiments, the apparatus is configured to prompt, via the user interface associated with the mobile device, the holder to consent to, accept, and/or agree to (collectively referred to herein as "agree to" for simplicity) one or more terms of the service for exceeding account thresholds. As used herein the phrases "exceeded threshold service" and "service for exceeding account thresholds" may be used interchangeably.

In some embodiments, the apparatus prompts the holder to agree to the one or more terms of the exceeded threshold service by prompting the holder to "opt into" and/or otherwise enroll in the exceeded threshold service. In some embodiments, as required by one or more laws, rules, and/or regulations, the holder must opt into the exceeded threshold service before the holder can participate in and/or otherwise use the exceeded threshold service. It will be understood that the holder may enroll in the exceeded threshold service at a banking center, through an electronic banking account, via a call center, and/or in some other way.

In other embodiments, the apparatus prompts the holder to agree to use the exceeded threshold service (and/or agree to the one or more terms of the exceeded threshold service) for this transaction (e.g., the transaction referred to in block 110, and the like) only. In such embodiments, the apparatus may receive the holder's agreement to use the exceeded threshold service (and/or agreement to the one or more terms of the exceeded threshold service) for this transaction only.

Additionally or alternatively, in some embodiments, the apparatus is configured to receive the holder's consent to the exceeded threshold (and/or to an associated exceeded threshold assessment), as represented by block 140, by receiving the holder's agreement to the one or more terms of the exceeded threshold service. Still further, in some embodiments, the apparatus is configured to send a confirmation message to the address associated with the mobile device, where the confirmation message includes information that confirms the holder's agreement to the one or more terms of the exceeded threshold service (and/or the holder's agreement to opt into and/or otherwise enroll in the exceeded threshold service, and/or the holder's agreement to use the exceeded threshold service for this transaction).

As used herein, the phrase exceeded threshold service" generally refers to a service that provides an account holder, account, and/or counterparty with the funds and/or credit necessary to complete an exceeded threshold transaction. For example, in some embodiments, where a transaction, if completed, would cause a checking account to exceed its available balance by $10, the exceeded threshold service can provide the checking account with the $10 needed to complete the transaction. In accordance with some embodiments, the exceeded threshold service is referred to as a surpassed balance service if the account participating in the service is a deposit account. In other embodiments, the exceeded threshold service is referred to as an exceeded credit threshold service if the account participating in the service is a credit account.

It will be understood that the exceeded threshold service includes one or more terms, which define the one or more rights, responsibilities, privileges, payments, features, and/or obligations of the exceeded threshold service. For example, in some embodiments, the one or more terms of the exceeded threshold service describe how the exceeded threshold service works; identify the exceeded threshold service provider; define what constitutes an exceeded threshold; identify the one or more exceeded threshold payments assessed for enrolling in the exceeded threshold service, for participating in the exceeded threshold service, and/or for engaging in an exceeded threshold transaction; and/or the like.

In some embodiments, the exceeded threshold service is provided by a financial institution, such as a bank, and is funded by that financial institution (and not by an account held by and/or otherwise associated with the holder). For example, in some embodiments, the exceeded threshold service is provided by the same financial institution that maintains the transaction machine, the apparatus configured to perform the process flow 100, and/or the account that incurs, or will incur, the excess threshold amount. It will be understood that, in some embodiments, the exceeded threshold service (and/or the exceeded threshold service provider) is regulated in the United States by the Electronic Funds Transfer Act, also known as Federal Reserve Board Regulation E (hereinafter "Regulation E"). In other embodiments, the exceeded threshold service (and/or exceeded threshold service provider) is regulated in the United States by the Credit Card Accountability Responsibility and Disclosure Act of 2009, which is codified in the United States as Public Law No. 111-24 (sometimes referred to herein, for simplicity, as the "Credit CARD Act of 2009" or the "CARD Act"). In some embodiments, the exceeded threshold service does not contractually obligate the exceeded threshold service provider to cover exceeded thresholds. In other words, in such embodiments, the exceeded threshold service provider may choose to cover surpassed balance and/or exceeded credit threshold transactions at its discretion. However, in other embodiments, the exceeded threshold service provider is contractually obligated and/or otherwise required to cover exceeded thresholds incurred by an account.

In some embodiments, one or more portions of the process flow 100 may be configured to comply with one or more portions of a law, rule, and/or regulation that is directed to and/or otherwise relates to an exceeded threshold (collectively referred to herein as exceeded threshold regulation" for simplicity). For example, in the United States, Regulation E regulates surpassed balance services provided by financial institutions. Accordingly, it will be understood that some embodiments of the present invention enable a financial institution to comply with Regulation E, the CARD Act, and/or one or more other exceeded threshold regulations. For example, in some embodiments, the exceeded threshold communication may comply with one or more notification requirements of an exceeded threshold regulation. As another example, in some embodiments, receiving the holder's consent to the exceeded threshold (and/or agreement to one or more terms of an exceeded threshold service), as represented by block 150, may comply with one or more consent, opt-in, and/or revocation requirements of an exceeded threshold regulation. As another example, in some embodiments, sending the holder a confirmation message that indicates the holder's consent to the exceeded threshold may comply with one or more confirmation requirements of an exceeded threshold regulation.

It will be understood that the apparatus having the process flow 100 can be configured to perform one or more portions of any embodiment described and/or contemplated herein, such as, for example, one or more portions of the process flow 200 described herein and/or one or more portions of the process flows described in connection with FIGS. 4 and/or 5. Also, the number, order, and/or content of the portions of the process flow 100 are exemplary and may vary. For example, in some embodiments, the apparatus having the process flow 100 is configured to assess a payment associated with the exceeded threshold (e.g., assess an exceeded threshold payment to the account and/or to the holder, and the like), where the payment is based at least partially on the account incurring an exceed threshold amount, where the payment is based at least partially on the amount of the excess threshold amount, and/or where the payment is assessed after authorizing and/or completing the transaction. In some embodiments, the apparatus is configured to: (a) assess the account an exceeded threshold payment based at least partially on the apparatus determining that the account settled negative at the end of the day in which the transaction occurred; and/or (b) determine not to assess the account an exceeded threshold payment based at least partially on the apparatus determining that the account settled non-negative (e.g., the account has a zero or positive available balance, and the like) at the end of the day in which the transaction occurred.

As another example, in some embodiments, the apparatus is configured to determine whether the holder has consented to an exceeded threshold and/or agreed to one or more terms of an exceeded threshold service. As another example, in some embodiments, the apparatus is configured to send, via the mobile device, the holder a confirmation message that confirms the holder's consent to the exceeded threshold. As still another example, in some embodiments, the apparatus is configured to store (e.g., in a datastore, in an online banking account, and the like) the holder's consent to the exceeded threshold, which may, in some embodiments, be required by one or more government and/or financial institution regulations (and/or one or more exceeded threshold regulations). As a further example, in some embodiments, the apparatus (and/or the transaction machine referred to in block 110) is configured to authenticate (e.g., confirm the identity of) the holder as a condition of accepting the holder's consent to the exceeded threshold and/or exceeded threshold service. In some embodiments, the apparatus (and/or transaction machine) is configured to authenticate the holder based at least partially on account information (e.g., ATM/debit/credit card, account number, username, password, PIN, biometric information, barcode, and the like) the holder inserts, provides, and/or presents (collectively referred to herein as "presents" for simplicity) to the transaction machine and/or to the apparatus having the process flow 100. As another example, in some embodiments, the apparatus is configured to post transaction information associated with the transaction (e.g., the transaction information referred to in block 110, and the like) to an electronic banking account associated with the account.

As another example of an additional or alternative portion, in some embodiments, the apparatus having the process flow 100 is configured to: (a) prompt the holder to consent to completing the transaction; and (b) receive the holder's consent to completing the transaction. It will be understood that the apparatus can prompt the holder to consent to completing the transaction in any way, including any of the ways previously described herein in connection with the holder being prompted to consent to the exceeded threshold (e.g., via the transaction machine, via the mobile device, and the like). The apparatus can also receive the holder's consent to completing the transaction in any way (e.g., via the transaction machine, via the mobile device, via one or more text notifications, and the like). For example, in some embodiments, the apparatus is configured to prompt the holder to consent to completing the transaction by prompting the holder to present or re-present account information at the transaction machine. In some embodiments, the holder presenting or re-presenting the account information at the transaction machine serves to indicate that the holder consents to completing the transaction.

In some embodiments, the apparatus is configured to prompt the holder to consent to completing the transaction in a communication that is separate and/or different than the exceeded threshold communication. In some of these embodiments, the holder is prompted to consent to completing the transaction after the holder is prompted to consent to the exceeded threshold. However, in other embodiments, the holder is prompted to consent to the exceeded threshold and consent to completing the transaction in the same communication. In some embodiments, the prompting the holder to consent to completing the transaction may comply with an exceeded threshold regulation (e.g., may comply with one or more revocation requirements associated with the exceeded threshold regulation, and the like).

As a further example of an additional or alternative portion, in some embodiments, the apparatus having the process flow 100 is configured to generate and/or send disclosure information to the holder (i.e., in addition to any disclosure information referred to in the process flow 100) before the exceeded threshold transaction is initiated, before the holder approaches the transaction machine, before the apparatus receives the transaction information, before the apparatus sends the exceeded threshold communication, and/or before the apparatus receives the holder's consent to the exceeded threshold (and/or agreement to one or more terms of an exceeded threshold service). For example, in some embodiments, before the apparatus receives the transaction information, the apparatus is configured to generate and/or send disclosure information to the holder that defines one or more terms of an exceeded threshold service. This disclosure information can be sent via one or more emails, telephone calls, text messages, instant messages, IVR communications, communications specific to one or more social media networks and/or applications, direct mailings, electronic banking account-specific messages, and/or the like. In some embodiments, the disclosure information is included in one or more communications typically sent to a holder, such as, for example, a periodic (e.g., monthly) account statement. In other embodiments, instead of sending the disclosure information before the exceeded threshold transaction is initiated, the apparatus having the process flow 100 is configured to the send the disclosure information to the holder during the transaction (e.g., via the mobile device and/or the transaction machine, and the like), so that the holder can review and consent to the one or more terms of the exceeded threshold service during the transaction and/or while the holder is at the transaction machine. In some of these embodiments, the holder can enroll in the exceeded threshold service at the transaction machine, after the exceeded threshold transaction has been initiated, and/or before the exceeded threshold transaction has been completed.

In some embodiments, sending the disclosure information to the holder may help a financial institution comply with one or more requirements of an exceeded threshold regulation. For example, in some embodiments, the disclosure information includes information similar or identical to the information shown in the A-9 Model Consent Form for Surpassed Balance Services, which is provided by the Federal Reserve at http://www.federalreserve.gov/DCCA/RegulationE/20081218/A-9.pdf and is incorporated herein by reference in its entirety. As such, prompting the holder to consent to the exceeded threshold, as represented by block 130, can include prompting the holder to agree, electronically sign, and/or otherwise acknowledge, via the user interface, that: (a) the holder has received the disclosure information; (b) the holder understands the one or more terms of the exceeded threshold service defined in the disclosure information; (c) the holder agrees to the one or more terms of the exceeded threshold service defined in the disclosure information (e.g., the holder enrolls in the exceeded threshold service, and the like); (d) the holder is already enrolled in the exceeded threshold service; and/or (e) the holder agrees to use the exceeded threshold service to complete the exceeded threshold transaction. Similarly, the receiving the holder's consent to the exceeded threshold, as represented by block 140, can include receiving one or more of the holder's agreements, signatures, and/or other acknowledgements in response to one or more of the above-described prompts. In some embodiments, because the holder is sent the disclosure information and prompted as described above, the prompting the holder to consent to the exceeded threshold and/or the receiving the holder's consent to the exceeded threshold may, individually or collectively, comply with one or more requirements of Regulation E and/or of one or more other exceeded threshold regulations.

Furthermore, in some embodiments of the invention, the apparatus includes a memory device that has information stored therein about whether the holder has been mailed or otherwise sent exceeded threshold service disclosure information prior to the transaction referred to in block 110. In some embodiments, the memory device additionally or alternatively stores information about whether the holder has enrolled in an exceeded threshold service prior to the transaction referred to in block 110. In some such embodiments of the invention, the apparatus may condition sending the exceeded threshold communication (and/or otherwise prompting the holder) based at least partially whether there is an indication in the memory device that the holder has already received the disclosure information and/or is already enrolled in the exceeded threshold service.

Referring now to FIG. 2, a more-detailed process flow 200 for providing an exceeded threshold service via a mobile device is provided, in accordance with an embodiment of the present invention. It will be understood that the process flow 200 illustrated in FIG. 2 represents an example embodiment of the process flow 100 described in connection with FIG. 1. In accordance with some embodiments, one or more portions of the process flow 200 are performed by an apparatus having hardware and/or software configured to perform one or more portions of the process flow 200. The apparatus having the process flow 200 includes, is included in, is embodied as, and/or can be operatively connected to the transaction machine referred to in the process flow 200. In accordance with some embodiments, the apparatus having the process flow 200 is maintained by a bank for the benefit of its customers. Also in accordance with some embodiments, the customer referred to in the process flow 200 is the user of the transaction machine and a customer of the bank. In addition, the account referred to in the process flow 200 is an account held by the customer and maintained by the bank. Further, the mobile device referred to in the process flow 200 is associated with the customer, is accessible to the customer during the transaction, and/or is carried, possessed, owned, and/or controlled by the customer during the transaction.

As represented by block 205, the bank customer approaches the transaction machine for the purpose of engaging in a transaction using the transaction machine. As represented by block 210, the customer presents account information at the transaction machine. For example, in some embodiments where the transaction machine is a POS device, the customer may swipe a debit and/or credit card associated with the account through the POS device in order to communicate account information associated with the account to the POS device and/or to the apparatus having the process flow 200. As another example, in some embodiments where the transaction machine is a personal computer, the customer may input account information into a web page associated with the transaction that is displayed at the personal computer. After the account information is presented, the transaction machine (and/or the apparatus having the process flow 200) identifies and/or authenticates the customer, as represented by block 215. In some embodiments, the transaction machine authenticates the customer based at least partially on the account information (e.g., userid/password, PIN, checkcard, account number, and the like) the customer presents to the transaction machine.

After being authenticated, the customer selects the transaction and/or agrees to the transaction amount, as represented by block 220. Then, as represented by block 225, the transaction machine sends an authorization request to the apparatus having the process flow 200, where the authorization request identifies and/or describes the transaction, the customer, the account, and/or the like. Upon receiving the authorization request, the apparatus must determine whether the account has sufficient available funds and/or credit to cover the transaction, as represented by block 230. If so, then the apparatus, as represented by blocks 235-240, approves the authorization request and/or instructs the transaction machine to complete the transaction. After the transaction is completed at the transaction machine, the customer leaves the transaction machine, as represented by block 245.

However, if the apparatus having the process flow 200 determines that the account does not have sufficient available funds and/or credit to cover the transaction, then the apparatus is configured to determine whether the customer is enrolled in an exceeded threshold service provided by the financial institution, as represented by block 250. If the customer is not enrolled in the exceeded threshold service, then the apparatus having the process flow 200 (and/or the transaction machine) is configured decline the authorization request and/or otherwise decline, cancel, abort, and/or reject the transaction, as represented by block 255. Thus, in this example embodiment, the exceeded threshold service cannot be used to complete the transaction if the holder is not already enrolled in the exceeded threshold service prior to the transaction being initiated. However, other embodiments may be different. For example, in some embodiments, the apparatus is configured to enroll the customer in the exceeded threshold service at some point during the transaction, such as, for example, after determining that the customer is not enrolled in the exceeded threshold service, as represented by block 250, and/or before the customer leaves the transaction machine, as represented by block 245.

Returning to FIG. 2, if the apparatus having the process flow 200 determines that the customer is enrolled in the exceeded threshold service, then the apparatus is configured to identify an address (e.g., phone number, email address, and the like) associated with the account, where the address is accessible to a mobile device, as represented by block 260. As represented by block 265, the apparatus is then configured to send a communication (e.g., the exceeded threshold communication described in connection with the process flow 100, and the like) to the address, where the communication includes information associated with the exceeded threshold and/or prompts the holder to consent to the exceeded threshold. In some embodiments, the apparatus having the process flow 200 is configured to prompt the customer to consent to the exceeded threshold within approximately fifteen seconds of the apparatus determining that the account does not have sufficient available funds and/or credit. After prompting the customer to consent to the exceeded threshold, the apparatus having the process flow 200 is configured to determine whether the customer consents to the exceeded threshold, as represented by block 270. If the customer indicates that he does not consent to the exceeded threshold (or if the apparatus does not receive a response from the customer within a predetermined period of time), then the apparatus is configured to decline the authorization request, as represented by block 255. However, if the customer does consent to the exceeded threshold, then the apparatus is configured to store the customer's consent in a datastore (e.g., computer-readable memory, and the like), as represented by block 275. It will be understood that the customer may consent to the exceeded threshold in any way. For example, in some embodiments, the customer consents to the exceeded threshold by sending a text message from the mobile device referred to in block 260. However, in other embodiments, the customer consents to the exceeded threshold via the transaction machine referred to in block 205. After receiving the customer's consent to the exceeded threshold, the apparatus having the process flow 200 approves the authorization request and otherwise completes the transaction, as represented by blocks 235-240. Again, once the transaction is completed, the customer leaves the transaction machine, as represented by block 245.

In accordance with some embodiments, one or more portions of the process flow 200 may comply with one or more requirements of an exceeded threshold regulation (e.g., Regulation E and/or the CARD Act in the United States, and the like). For example, in some embodiments, receiving the customer's consent to the exceeded threshold, as represented by the "Yes" arrow between blocks 270 and 275, may comply with one or more consent requirements of an exceeded threshold regulation. In addition, in some embodiments, receiving the customer's consent may comply with one or more exceeded threshold regulation requirements because, for example, the customer was first authenticated by the transaction machine and/or by the apparatus having the process flow 200.

Of course, it will also be understood that the embodiment illustrated in FIG. 2 is merely exemplary and that other embodiments may vary without departing from the scope and spirit of the present invention. For example, in some embodiments, the apparatus having the process flow 200 is additionally configured to prompt the customer (e.g., via the mobile device, via the transaction machine, and the like) to consent to completing the transaction. As another example, in some embodiments, the apparatus is configured to send a confirmation message to the customer that confirms the customer's consent to the exceeded threshold. As still another example, in some embodiments, the apparatus is configured to provide funds and/or credit sufficient to complete the transaction. In such embodiments, the apparatus may provide the funds and/or credit to the account and/or to the counterparty involved in the transaction (e.g., a merchant, and the like). Additionally or alternatively, in some embodiments, the apparatus may provide only the minimum amount of funds and/or credit needed to complete the transaction.

In addition, the apparatus having the process flow 200 can be configured to perform one or more portions of the process flow 200 in real time, in substantially real time, and/or at one or more predetermined times. The apparatus having the process flow 200 may be configured to perform any of the portions of the process flow 200 represented by blocks 205-275 upon or after one or more triggering events (which, in some embodiments, is the performance of one or more of the other portions of the process flow 200). In addition, in some embodiments, the apparatus having the process flow 200 (and/or a customer thereof) is configured to perform each portion of the process flow 200, from start to finish, within moments, seconds, and/or minutes (e.g., within approximately 1-15 minutes, and the like).

Referring now to FIG. 3, a system 300 for providing an exceeded threshold service is provided, in accordance with an embodiment of the present invention. As illustrated, the system 300 includes a network 310, a transaction machine 320, an authorization apparatus 330, and a mobile device 340. FIG. 3 also shows an account holder 302 and an account 308. The account 308 (e.g., credit account, deposit account, and the like) is associated with an electronic banking account 309 (e.g., online banking account, mobile banking account, and the like). As shown, the holder 302 has access to the mobile device 340 and the transaction machine 320. In accordance with some embodiments, the transaction machine 320 and the authorization apparatus 330 are each maintained by the same financial institution. For example, in some embodiments, the holder 302 is a customer of the financial institution, the authorization apparatus 330 is embodied as an ATM transaction server maintained by the financial institution, and the transaction machine 320 is embodied as an ATM maintained by the financial institution. However, in other embodiments, the transaction machine 320 and the authorization apparatus 330 are maintained by separate entities. For example, in some embodiments, the transaction machine 320 is embodied as a POS device maintained by a merchant, and the authorization apparatus 330 is embodied as an authorization server maintained by a financial institution. In accordance with some embodiments, the mobile device 340 is associated with the holder 302 and/or is carried, owned, possessed, and/or owned by the holder 302.

As shown in FIG. 3, the transaction machine 320, the authorization apparatus 330, and the mobile device 340 are each operatively and selectively connected to the network 310, which may include one or more separate networks. The network 310 may include one or more payment networks (e.g., interbank networks, credit card payment networks, any wireline and/or wireless network over which payment information is sent, and the like), telephone networks (e.g., cellular networks, CDMA networks, any wireline and/or wireless network over which communications to telephones and/or mobile phones are sent, and the like), local area networks (LANs), wide area networks (WANs), global area networks (GANs) (e.g., the Internet, and the like), and/or one or more other telecommunications networks. For example, in some embodiments, the network 310 includes a telephone network (e.g., for communicating with the mobile device 340, and the like) and a payment network (e.g., for communicating with the transaction machine 320, and the like). It will also be understood that the network 310 may be secure and/or unsecure and may also include wireless and/or wireline technology.

The transaction machine 320 may include any computerized apparatus that can be configured to perform any one or more of the functions of the transaction machine 320 described and/or contemplated herein. It will also be understood that the transaction machine 320 can include and/or be embodied as, any transaction machine described and/or contemplated herein. It will further be understood that the transaction machine 320 can initiate, perform, complete, and/or otherwise facilitate any transaction described and/or contemplated herein as being initiated, performed, and/or otherwise facilitated by a transaction machine. For example, in some embodiments, the transaction machine 320 includes and/or is embodied as an ATM, a POS device, a self-checkout machine, a vending machine, a ticketing kiosk, a personal computer, a gaming device, a mobile phone, and/or the like. As another example, in some embodiments, the transaction machine 320 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, and the like); withdrawing cash; making deposits (e.g., cash, checks, and the like); making payments (e.g., paying telephone bills, sending remittances, and the like); accessing the Internet; and/or the like.

In some embodiments, the transaction machine 320 (and/or one or more other portions of the system 300) requires its users to authenticate themselves to the transaction machine 320 before the transaction machine 320 will initiate, perform, complete, and/or facilitate a transaction. For example, in some embodiments, the transaction machine 320 (and/or the transaction application 327) is configured to authenticate a transaction machine user based at least partially on an ATM/debit/credit card, loyalty/rewards/club card, smart card, token (e.g., USB token, and the like), username/password, personal identification number (PIN), biometric information, and/or one or more other credentials that the user presents to the transaction machine 320. Additionally or alternatively, in some embodiments, the transaction machine 320 is configured to authenticate a user by using one-, two-, or multi-factor authentication. For example, in some embodiments, the transaction machine 320 requires two-factor authentication, such that the holder 302 must provide a valid debit card and enter the correct PIN associated with the debit card in order to authenticate the holder 302 to the transaction machine 320.

As illustrated in FIG. 3, in accordance with some embodiments of the present invention, the transaction machine 320 includes a communication interface 322, a processor 324, a memory 326 having a transaction application 327 stored therein, and a user interface 329. In such embodiments, the processor 324 is operatively and selectively connected to the communication interface 322, the user interface 329, and the memory 326.

Each communication interface described herein, including the communication interface 322, generally includes hardware, and, in some instances, software, that enables a portion of the system 300, such as the transaction machine 320, to send, receive, and/or otherwise communicate information to and/or from the communication interface of one or more other portions of the system 300. For example, the communication interface 322 of the transaction machine 320 may include a modem, network interface controller (NIC), NFC interface, network adapter, network interface card, and/or some other electronic communication device that operatively connects the transaction machine 320 to another portion of the system 300, such as, for example, the authorization apparatus 330.

Each processor described herein, including the processor 324, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 327 of the memory 326 of the transaction machine 320.

Each memory device described herein, including the memory 326 for storing the transaction application 327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 3, the memory 326 includes the transaction application 327. It will be understood that the transaction application 327 can be operable (e.g., usable, executable, and the like) to initiate, perform, complete, and/or facilitate one or more portions of any embodiment described and/or contemplated herein, such as, for example, one or more portions of the process flows 100 and/or 200 described herein and/or one or more portions of the process flows described in connection with FIGS. 4 and/or 5. For example, in some embodiments, the transaction application 327 is operable to receive transaction information associated with a transaction. As another example, in some embodiments, the transaction application 327 is operable to prompt, via the user interface 329, the holder 302 to consent to an exceeded threshold, to completing a transaction, to incurring an exceeded threshold payment, to using an exceeded threshold service, and/or to one or more terms of an exceeded threshold service. As still another example, in some embodiments, the transaction application 327 is operable to receive, via the user interface 329, the holder's 302 consent to the exceeded threshold, to completing the transaction, to incurring the exceeded threshold payment, to using the exceeded threshold service, and/or to the one or more terms of the exceeded threshold service. As another example, in some embodiments, the transaction application 327 is operable to determine, based at least partially on transaction information, that an account (e.g., the account 308, and the like) will incur an excess threshold amount as a result of a transaction. In some embodiments, the transaction application 327 is operable to complete one or more transactions at the transaction machine 320 (e.g., complete a purchase transaction, dispense cash, accept a check for deposit, and the like).

In some embodiments, where the transaction machine 320 includes and/or is embodied as an ATM, the transaction application 327 is configured to execute on the ATM in order to initiate, perform, complete, and/or facilitate, for example, one or more cash withdrawals, deposits, and/or the like. In other embodiments, where the transaction machine 320 includes and/or is embodied as a POS device, the transaction application 327 is configured to execute on the POS device in order to initiate, perform, complete, and/or facilitate, for example, one or more debit card and/or credit card transactions. In still other embodiments, where the transaction machine 320 includes and/or is embodied as a personal computer, the transaction application 327 is configured to execute on the personal computer, and, in some embodiments, the transaction application 327 is embodied as a web browser (i.e., for navigating the Internet, and the like) that is operable to initiate, perform, complete, and/or otherwise facilitate one or more financial and/or non-financial transactions.

In some embodiments, the transaction application 327 is operable to enable the holder 302 and/or transaction machine 320 to communicate with one or more other portions of the system 300, and/or vice versa. In some embodiments, the transaction application 327 is additionally or alternatively operable to initiate, perform, complete, and/or otherwise facilitate one or more financial and/or non-financial transactions. In some embodiments, the transaction application 327 includes one or more computer-executable program code portions for causing and/or instructing the processor 324 to perform one or more of the functions of the transaction application 327 and/or transaction machine 320 described and/or contemplated herein. In some embodiments, the transaction application 327 includes and/or uses one or more network and/or system communication protocols.

As shown in FIG. 3, the transaction machine 320 also includes the user interface 329. It will be understood that the user interface 329 (and any other user interface described and/or contemplated herein) can include and/or be embodied as one or more user interfaces. It will also be understood that, in some embodiments, the user interface 329 includes one or more user output devices for presenting information and/or one or more items to the transaction machine user (e.g., the holder 302, and the like), such as, for example, one or more displays, speakers, receipt printers, dispensers (e.g., cash dispensers, ticket dispensers, merchandise dispensers, and the like), and/or the like. In some embodiments, the user interface 329 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, styluses, scanners, biometric readers, motion detectors, cameras, card readers (e.g., for reading the magnetic strip on magnetic cards such as ATM, debit, credit, and/or bank cards, and the like), deposit mechanisms (e.g., for depositing checks and/or cash, and the like), and/or the like for receiving information from one or more items and/or from the transaction machine user (e.g., the holder 302, and the like). In some embodiments, the user interface 329 and/or the transaction machine 320 includes one or more vaults, security sensors, locks, and/or anything else typically included in and/or near the transaction machine.

FIG. 3 also illustrates an authorization apparatus 330, in accordance with an embodiment of the present invention. The authorization apparatus 330 may include any computerized apparatus that can be configured to perform any one or more of the functions of the authorization apparatus 330 described and/or contemplated herein. It will also be understood that the authorization apparatus 330 can include and/or be embodied as any authorization apparatus described and/or contemplated herein. It will further be understood that the authorization apparatus 330 can initiate, perform, complete, and/or otherwise facilitate any transaction described and/or contemplated herein as being initiated, performed, and/or otherwise facilitated by an authorization apparatus. In some embodiments, the authorization apparatus 330 includes and/or is embodied as one or more servers, engines, mainframes, personal computers, ATMs, network devices, front end systems, back end systems, and/or the like. In some embodiments, such as the one illustrated in FIG. 3, the authorization apparatus 330 includes a communication interface 332, a processor 334, and a memory 336, which includes an authorization application 337 and an authorization datastore 338 stored therein. As shown, the communication interface 332 is operatively and selectively connected to the processor 334, which is operatively and selectively connected to the memory 336.

The authorization application 337 can be operable (e.g., usable, executable, and the like) to initiate, perform, complete, and/or facilitate any one or more portions of the process flows 100 and/or 200 described herein and/or one or more portions of the process flows described in connection with FIGS. 4 and/or 5. For example, in some embodiments, the authorization application 337 is operable to prompt, via the user interface 329 of the transaction machine 320, the holder 302 to consent to an exceeded threshold, to completing a transaction, and/or to one or more terms of an exceeded threshold service. As another example, in some embodiments, the authorization application 337 is operable to prompt, via the user interface 349 of the mobile device 340, the holder 302 to consent to an exceeded threshold, to completing a transaction, and/or to one or more terms of an exceeded threshold service. As still another example, in some embodiments, the authorization application 337 is operable to receive transaction information associated with a transaction. As another example, in some embodiments, the authorization application 337 is operable to receive, via the transaction machine 320 and/or the mobile device 340, the holder's 302 consent to one or more exceeded thresholds, to completing one or more transactions, and/or to one or more terms of an exceeded threshold service. As another example, in some embodiments, the authorization application 337 is operable to determine, based at least partially on transaction information, that an account will incur an excess threshold amount as a result of a transaction. As still another example, in some embodiments, the authorization application 337 is operable to authorize a transaction and/or complete a transaction.

As another example, in some embodiments, the authorization application 337 is operable to generate and/or send disclosure information to the holder 302, where the disclosure information defines one or more terms of an exceeded threshold service. In some embodiments, the authorization application 337 generates and/or sends this disclosure information to the holder 302 prior to the holder 302 initiating and/or engaging in a transaction at the transaction machine 320. However, in other embodiments, the authorization application 337 is operable to send the disclosure information to the holder 302 during the exceeded threshold transaction and/or while the holder 302 is standing at the transaction machine 320. Also, in some embodiments, the authorization application 337 is further operable to prompt the holder 302 (e.g., via the user interface 329, via the user interface 349, during the exceeded threshold transaction, and the like) to agree to the one or more terms of the exceeded threshold service defined in the disclosure information. In some embodiments, the authorization application 337 is operable to send a confirmation message to the holder 302 that confirms the holder's consent to the exceeded threshold and/or to completing the transaction. In some embodiments, the authorization application 337 is operable to perform one or more of these (and/or other) functions, such that a financial institution may comply with one or more exceeded threshold regulation requirements (e.g., Regulation E in the United States, and the like).

In some embodiments, the authorization application 337 is operable to enable the authorization apparatus 330 to communicate with one or more other portions of the system 300, such as, for example, the authorization datastore 338, the mobile device 340, and/or the transaction machine 320, and/or vice versa. In addition, in some embodiments, the authorization application 337 is operable to initiate, perform, complete, and/or otherwise facilitate one or more financial and/or non-financial transactions. In some embodiments, the authorization application 337 includes one or more computer-executable program code portions for causing and/or instructing the processor 334 to perform one or more of the functions of the authorization application 337 and/or the authorization apparatus 330 that are described and/or contemplated herein. In some embodiments, the authorization application 337 includes and/or uses one or more network and/or system communication protocols.

In addition to the authorization application 337, the memory 336 also includes the authorization datastore 338. It will be understood that the authorization datastore 338 can be configured to store any type and/or amount of information. For example, in some embodiments, the authorization datastore 338 includes information associated with one or more transaction machines, transaction machine users, transactions, exceeded thresholds, financial accounts, electronic banking accounts, addresses associated with accounts, mobile devices, exceeded threshold services, authorization requests, exceeded threshold regulations, and/or the like. In some embodiments, the authorization datastore 338 may also store any information related to providing an exceeded threshold service via a mobile device and/or a transaction machine. In some embodiments, the authorization datastore 338 additionally or alternatively stores information associated with electronic banking and/or electronic banking accounts.

In accordance with some embodiments, the authorization datastore 338 may include any one or more storage devices, including, but not limited to, datastores, databases, and/or any of the other storage devices typically associated with a computer system. It will also be understood that the authorization datastore 338 may store information in any known way, such as, for example, by using one or more computer codes and/or languages, alphanumeric character strings, data sets, figures, tables, charts, links, documents, and/or the like. Further, in some embodiments, the authorization datastore 338 includes information associated with one or more applications, such as, for example, the authorization application 337 and/or the transaction application 327. In some embodiments, the authorization datastore 338 provides a real-time or near real-time representation of the information stored therein, so that, for example, when the processor 334 accesses the authorization datastore 338, the information stored therein is current or nearly current. Although not shown, in some embodiments, the transaction machine 320 includes a transaction datastore that is configured to store any information associated with the transaction machine 320, the transaction application 327, and/or the like. It will be understood that the transaction datastore can store information in any known way, can include information associated with anything shown in FIG. 3, and/or can be configured similar to the authorization datastore 338.

Referring now to FIG. 3A, a block diagram is provided that illustrates the mobile device 340 of FIG. 3 in more detail, in accordance with an embodiment of the invention. In some embodiments, the mobile device 340 is a mobile phone, but in other embodiments, the mobile device 340 can include and/or be embodied as any other mobile device described and/or contemplated herein. The mobile device 340 generally includes a processor 344 operatively connected to such devices as a memory 346, user interface 349 (i.e., user output devices 349A and user input devices 349B), a communication interface 342, a power source 345, a clock or other timer 343, a camera 341, and a positioning system device 390.

The processor 344 may include the functionality to encode and interleave messages and data prior to modulation and transmission. The processor 344 can additionally include an internal data modem. Further, the processor 344 may include functionality to operate one or more software programs, which may be stored in the memory 346. For example, the processor 344 may be capable of operating a connectivity program, such as a web browser application 348. The web browser application 348 may then allow the mobile device 340 to transmit and receive web content, such as, for example, location-based content and/or other web page content, according to a Wireless Application Protocol (WAP), Hypertext Transfer Protocol (HTTP), and/or the like.

The processor 344 is configured to use the communication interface 342 to communicate with one or more other devices on the network 310. In this regard, the communication interface 342 includes an antenna 376 operatively coupled to a transmitter 374 and a receiver 372 (together a "transceiver"). The processor 344 is configured to provide signals to and receive signals from the transmitter 374 and receiver 372, respectively. The signals may include signaling information in accordance with the air interface standard of the applicable cellular system of the wireless telephone network 310. In this regard, the mobile device 340 may be configured to operate with one or more air interface standards, communication protocols, modulation types, and access types. By way of illustration, the mobile device 340 may be configured to operate in accordance with any of a number of first, second, third, and/or fourth-generation communication protocols and/or the like. For example, the mobile device 340 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 340 may also be configured to operate in accordance with non-cellular communication mechanisms, such as via a wireless local area network (WLAN) or other communication/data networks.

The communication interface 342 may also include a near field communication (NFC) interface 370. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 370 may include a smart card, key card, proximity card, wireless communication device, radio frequency identification (RFID) tag and/or reader, transmitter, receiver, and/or the like. In some embodiments, the NFC interface 370 communicates information via radio, infrared (IR), and/or optical transmissions. In some embodiments, the NFC interface 370 is configured to operate as an NFC transmitter and/or as an NFC receiver (e.g., an NFC reader, and the like). In some embodiments, the NFC interface 370 enables the mobile device 340 to operate as a mobile wallet. Also, it will be understood that the NFC interface 370 may be embedded, built, carried, and/or otherwise supported in and/or on the mobile device 340. In some embodiments, the NFC interface 370 is not supported in and/or on the mobile device 340, but the NFC interface 370 is otherwise operatively connected to the mobile device 340 (e.g., where the NFC interface 370 is a peripheral device plugged into the mobile device 340, and the like). Other apparatuses having NFC interfaces mentioned herein may be configured similarly.

In some embodiments, the NFC interface 370 of the mobile device 340 is configured to contactlessly and/or wirelessly communicate information to and/or from a corresponding NFC interface of another apparatus (e.g., the transaction machine 320, and the like). For example, in some embodiments, the mobile device 340 is a mobile phone, the NFC interface 370 is a smart card having account information stored therein, and the transaction machine 320 is a POS device having an NFC reader operatively connected thereto. In such embodiments, when the mobile phone and/or smart card is brought within a relatively short range of the NFC reader, the smart card is configured to wirelessly and/or contactlessly send the account information to the NFC reader in order to, for example, initiate, perform, complete, and/or otherwise facilitate a transaction.

In addition to the NFC interface 370, the mobile device 340 can have a user interface 349 that is, like other user interfaces described herein, made up of one or more user output devices 349A and/or user input devices 349B. The user output devices 349A include a display 380 (e.g., a liquid crystal display and/or the like) and a speaker 382 and/or other audio device, which are operatively coupled to the processor 344. The user input devices 349B, which allow the mobile device 340 to receive data from a user such as the holder 302, may include any of a number of devices allowing the mobile device 340 to receive data from a user, such as a keypad, keyboard, touch-screen, touchpad, microphone, mouse, joystick, other pointer device, button, soft key, and/or other input device(s). The user interface 349 may also include a camera 341, such as a digital camera.

In some embodiments, the mobile device 340 also includes a positioning system device 390 that can be used to determine the location of the mobile device 340. For example, the positioning system device 390 may include a GPS transceiver. In some embodiments, the positioning system device 390 is at least partially made up of the antenna 376, transmitter 374, and receiver 372 described above. For example, in one embodiment, triangulation of cellular signals may be used to identify the approximate location of the mobile device 340. In other embodiments, the positioning system device 390 includes a proximity sensor and/or transmitter, such as an RFID tag, that can sense or be sensed by devices known to be located proximate a merchant and/or other location to determine that the mobile device 340 is located proximate these known devices.

The mobile device 340 further includes a power source 345, such as a battery, for powering various circuits and other devices that are used to operate the mobile device 340. Embodiments of the mobile device 340 may also include a clock or other timer 343 configured to determine and, in some cases, communicate actual or relative time to the processor 344 or one or more other devices.

The mobile device 340 also includes a memory 346 operatively connected to the processor 344. As used herein, memory includes any computer readable medium (as defined herein) configured to store data, code, and/or other information. The memory 346 may include volatile memory, such as volatile Random Access Memory (RAM) including a cache area for the temporary storage of data. The memory 346 may also include non-volatile memory, which can be embedded and/or may be removable. The non-volatile memory can additionally or alternatively include an electrically erasable programmable read-only memory (EEPROM), flash memory or the like.

The memory 346 can store any of a number of applications which may include computer-executable instructions/code executed by the processor 344 to implement the functions of the mobile device 340 described herein. For example, the memory 346 may include such applications as a web browser application 348 and/or a mobile banking application 347. It will be understood that the web browser application 348 and/or the mobile banking application 347 can be, individually or collectively, operable (e.g., usable, executable, and the like) to initiate, perform, complete, and/or facilitate any one or more portions of the process flows 100 and/or 200 described herein and/or one or more portions of the process flows described in connection with FIGS. 4 and/or 5. For example, in some embodiments, the mobile banking application 347 (and/or the web browser application 348) is operable to prompt, via the user interface 349, the holder 302 to consent to an exceeded threshold, to completing a transaction, and/or to one or more terms of an exceeded threshold service. As still another example, in some embodiments, the mobile banking application 347 (and/or the web browser application 348) is operable to receive, via the user interface 349, the holder's 302 consent to the exceeded threshold, to completing the transaction, and/or to the one or more terms of the exceeded threshold service.

In some embodiments, these applications provide a graphical user interface (GUI) on the display 380 that allows the holder 302 to communicate with the mobile device 340, the transaction machine 320, the authorization apparatus 330, and/or one or more other portions of the system 300. In some embodiments, the holder 302 can use the mobile banking application 347 to access the electronic banking account 309 (e.g., mobile banking account, and the like) that is associated with the account 308. The memory 346 can also store any type and/or amount information used by the mobile device 340, and/or used by the applications and/or the devices that make up the mobile device 340 and/or that are in communication with the mobile device 340, to implement the functions of the mobile device 340 and/or the other systems described and/or contemplated herein. For example, in some embodiments, the memory 346 stores account information (e.g., routing and/or account numbers, account names, username/passwords, PINS, biometric information, and the like) associated with the holder 302.

The embodiments illustrated in FIGS. 3 and 3A are exemplary and other embodiments may vary. For example, in some embodiments, some or all of the portions of the system 300 are combined into a single portion. Specifically, in some embodiments, the transaction machine 320 and the authorization apparatus 330 are combined into a single transaction and authorization apparatus that is configured to perform all of the same functions of those separate portions as described and/or contemplated herein. Likewise, in some embodiments, some or all of the portions of the system 300 are separated into two or more distinct portions. In addition, the various portions of the system 300 may be maintained by the same or separate parties.

The system 300 and/or one or more portions of the system 300 may include and/or implement any embodiment of the present invention described and/or contemplated herein. For example, in some embodiments, the system 300 (and/or one or more portions of the system 300) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow described and/or contemplated herein in connection with FIG. 4, and/or any one or more of embodiments of the process flow described and/or contemplated herein in connection with FIG. 5.

As a specific example, in accordance with an embodiment of the present invention, the authorization apparatus 330 is configured to: (a) receive transaction information associated with a transaction, where the transaction involves the account 308, the transaction machine 320, and the holder 302, as represented by block 110 in FIG. 1; (b) determine, based at least partially on the transaction information, that the account 308 will incur an exceeded threshold as a result of the transaction, as represented by block 120; (c) prompt, via the user interface 349 of the mobile device 340, the holder 302 to consent to the exceeded threshold, as represented by block 130; (d) receive (e.g., via the user interface 349, via the user interface 329 of the transaction machine 320, and the like) the holder's 302 consent to the exceeded threshold, as represented by block 140; and (e) authorize the transaction based at least partially on receiving the holder's 302 consent, as represented by block 150. In accordance with some embodiments, the transaction machine 320, the authorization apparatus 330, and/or the mobile device 340 are each configured to send and/or receive one or more instructions to and/or from each other, such that an instruction sent, for example, from the authorization apparatus 330 to the mobile device 340 (and/or vice versa) can trigger the mobile device 340 (and/or vice versa) to perform one or more portions of any one or more of the embodiments described and/or contemplated herein.

Referring now to FIG. 4, a mixed block and flow diagram of a system 400 for providing a surpassed balance service via a mobile phone is provided, in accordance with an exemplary embodiment of the present invention. It will be understood that the system 400 illustrated in FIG. 4 represents an example embodiment of the process flow 200 described in connection with FIG. 2. As shown, the system 400 includes a POS device 401 (e.g., the transaction machine 320, a merchant terminal, and the like), an authorization server 403 (e.g., the authorization apparatus 330, and the like), and a mobile phone 405 (e.g., the mobile device 340, and the like). The POS device 401, the authorization server 403, and the mobile phone 405 may each include a communication interface, a user interface, a processor, a memory, an application, and/or a datastore, and those devices may be operatively connected to each other.

In accordance with some embodiments, the POS device 401 and the mobile phone 405 are operatively and selectively connected to the authorization server 403 via one or more networks (not shown). For example, in some embodiments, the POS device 401 is operatively connected to the authorization server 403 via a payment network, and/or the mobile phone 405 is operatively connected to the authorization server 403 via a telephone network. Also, the POS device 401 and the mobile phone 405 are accessible to a customer of a financial institution (not shown). Also, in this example embodiment, the POS device 401 is maintained by a merchant, the mobile phone 405 is maintained by the customer of the financial institution, and the authorization server 403 is maintained by the financial institution. Further, in accordance with some embodiments, the financial institution maintains the checking account held by the customer and associated with the debit card mentioned below.

As represented by block 402, the customer swipes a debit card at the POS device 401 to engage in a debit card transaction involving the customer and the merchant. Although not shown, the POS device 401 may also authenticate the customer based at least partially on one or more credentials the customer provides to the POS device 401 (e.g., based on the debit card swiped, and the like). Next, as represented by block 404, the POS device 401 generates and sends an authorization request associated with the debit card transaction to the authorization server 403. In accordance with some embodiments, the authorization request includes information that, for example, identifies the customer, the checking account associated with the debit card, the amount of the transaction, the one or more goods and/or services involved in the transaction, and/or the like. As represented by block 406, the authorization server 403 then determines that the checking account associated with the debit card will incur a surpassed balance as a result of the transaction. In this example embodiment, after making the surpassed balance determination, the authorization server 403 declines the authorization request, as represented by block 408. Also, as represented by block 410, the authorization server 403 determines that the customer is enrolled in a surpassed balance service provided by the financial institution. Thereafter, as represented by block 412, the authorization server 403 identifies a phone number associated with the checking account by, for example, accessing an account data store having information associated with the checking account stored therein.

After the authorization server 403 identifies the phone number, the authorization server 403 sends a text message (e.g., SMS message, MMS message, EMS message, and the like) to the phone number, which corresponds to the mobile phone 405, as represented by block 414. In accordance with some embodiments, the text message received by the mobile phone 405 notifies the customer of the surpassed balance and prompts the customer to consent to the surpassed balance by return text message. In some embodiments, the text message received by the mobile phone 405 is delivered visually to the customer via a display of the mobile phone 405. After reading the text message at the mobile phone 414, the customer sends, via a second text message, his consent to the surpassed balance back to the authorization server 403, as represented by block 416. For example, in some embodiments, the customer sends a "Yes" SMS message to a financial institution phone number, where the phone number was provided in the SMS message originally sent from the authorization server 403. In some embodiments, by consenting to the surpassed balance, the customer agrees to surpassed balance the checking account in order to complete the surpassed balance transaction.

After the customer consents to the surpassed balance, the authorization server 403 stores the customer's consent in a data store, as represented by block 418. In addition, the authorization server 403 sends another text message to the mobile phone 405 via the phone number, where the text message prompts the customer to re-swipe his debit card at the POS device 401 to complete the transaction, as represented by block 420. Thereafter, the customer re-swipes the debit card at the POS device 401, as represented by block 422. In some embodiments, the customer re-swiping his debit card at the POS device 401 serves to indicate that the customer consents to completing the transaction.

After the customer re-swipes, the POS device 401 generates and sends another authorization request to the authorization server 403, as represented by block 424, which is approved by the authorization server 403, as represented by block 426. In some embodiments, the authorization server 403 approves the second authorization request based at least partially on receiving the customer's consent to the surpassed balance (via the text message) and/or based at least partially on the customer re-swiping his debit card at the POS device 401. After the second authorization request has been approved, the transaction is completed at the POS device 401, as represented by block 428. It will be understood that, in some embodiments, the first authorization request, as represented by block 404, represents the first attempt to complete the transaction referred to in block 402, and the second authorization request, as represented by block 424, represents a second attempt to complete the same transaction.

Of course, the embodiment illustrated in FIG. 4 is merely exemplary and other embodiments may vary without departing from the scope and spirit of the present invention. For example, in some alternative embodiments, the first authorization request is not declined by the authorization server 403, the customer is not required to re-swipe the debit card at the POS device 401, and the second authorization request is never sent. Instead, in such embodiments, after receiving the customer's consent to the surpassed balance, the authorization server 403 is configured to approve the first authorization request referred to in block 404, and the transaction is completed at the POS device 401. As another example, in some alternative embodiments, one or more portions of the process flow being performed by the mobile phone 405 are performed instead by the POS device 401. As still another example, in some alternative embodiments of the present invention, instead of involving a debit card, a checking account, a debit card transaction, and/or a surpassed balance service, the process flow shown in FIG. 4 involves a credit card, a credit card account, a credit card transaction, and/or an exceeded credit threshold service.

Also, in some embodiments, one or more of the portions of the process flow represented by blocks 402-428 are triggered by one or more triggering events, which, in some embodiments, include the performance of one or more of the other portions of the process flow represented by blocks 402-428. Also, in some embodiments, the system 400 is configured to perform the entire process flow represented by blocks 402-428, from start to finish, within moments, seconds, and/or minutes. For example, in some embodiments, the customer consents to the surpassed balance within approximately 1-15 minutes of the authorization server 403 receiving the authorization request from the POS device 401. Further, it will be understood that one or more portions of the process flow represented by blocks 402-428 are configured to comply with one or more requirements of an exceeded threshold regulation (e.g., Regulation E and/or the CARD Act in the United States).

Referring now to FIG. 5, a mixed block and flow diagram of a system 500 for providing an exceeded credit threshold service via a mobile phone having an NFC interface is provided, in accordance with an exemplary embodiment of the present invention. It will be understood that the system 500 illustrated in FIG. 5 represents an example embodiment of the process flow 100 described in connection with FIG. 1. As shown, the system 500 includes a POS device 501 having an NFC interface, a mobile phone 503 having an NFC interface, and an authorization server 505. The POS device 501, the mobile phone 503, and the authorization server 505 may each include a communication interface, a user interface, a processor, a memory, an application, and/or a data store, and those devices may be operatively connected to each other.

In accordance with some embodiments, the POS device 501 and the mobile phone 503 are operatively and selectively connected to the authorization server 505 via one or more networks (not shown). For example, in some embodiments, the POS device 501 is operatively connected to the authorization server 505 via a payment network, and/or the mobile phone 503 is operatively connected to the authorization server 505 via a telephone network. In addition, the NFC interface of the mobile phone 503 and the NFC interface of the POS device 501 enable the mobile phone 503 to wirelessly and/or contactlessly communicate with the POS device 501. For example, in some embodiments, the mobile phone 503 includes a smart card that is configured to wirelessly and/or contactlessly communicate account and/or transaction information to and/or from an NFC reader associated with the POS device 501. As such, in accordance with some embodiments, the mobile phone 503 is configured to operate as a mobile wallet.

It will be understood that the POS device 501 and the mobile phone 503 are accessible to the customer referred to in block 502. Also, in this example embodiment, the POS device 501 is maintained by a merchant, the mobile phone 503 is maintained by the customer of a bank, and the authorization server 505 is maintained by the bank. Further, in accordance with some embodiments, the bank maintains the credit card account held by the customer, and the mobile phone is associated with the credit card account.

As represented by block 502, the customer logs in to a mobile banking account accessible through the mobile phone 503. In some embodiments, the mobile banking account is accessible through a mobile banking application that is installed and executes on the mobile phone 503. In some embodiments, the mobile banking application authenticates the customer before providing the customer access to the mobile banking account. In some embodiments, the mobile banking application authenticates the customer based at least partially on one or more credentials provided by the customer to the application.

After logging in, the customer presents the mobile phone 503 to the POS device 501 to engage in the transaction, as represented by block 504. For example, in some embodiments, the customer "taps" the mobile phone 503 to the POS device 501 by holding the NFC interface of the mobile phone 503 within a relatively short range of (e.g., within approximately four inches of, and the like) the NFC interface of the POS device 501. When the mobile phone 503 is presented to the POS device 501, the POS device 501 receives credit card account information from the mobile phone 503, as represented by block 506. Thereafter, the POS device 501 generates and sends an authorization request associated with the transaction to the authorization server 505, as represented by block 508. In accordance with some embodiments, the authorization request includes information that, for example, identifies the customer, the credit card account associated with the mobile phone, the amount of the transaction, the one or more goods and/or services involved in the transaction, and/or the like. After receiving the authorization request, as represented by block 510, the authorization server 505 determines that the credit card account involved in the transaction will exceed the credit threshold as a result of the transaction. After making the exceeded credit threshold determination, the authorization server 505, in this example embodiment, determines that the customer is enrolled in an exceeded credit threshold service provided by the bank, as represented by block 512. Thereafter, as represented by block 514, the authorization server 505 identifies the mobile banking account associated with the credit card account.

After the authorization server 505 identifies the mobile banking account, the authorization server 505 sends a mobile banking account-specific communication that is accessible to the mobile phone 503, as represented by block 516. In accordance with some embodiments, the communication notifies the customer of the exceeded credit threshold amount and prompts the customer to consent to exceeding the credit threshold. In some embodiments, the communication received by the mobile phone 503 is delivered visually to the customer via a display of the mobile phone 503 and/or audibly via a speaker of the mobile phone 503. After reading the communication at the mobile phone 503, the customer consents, via the mobile banking account, to exceed the credit threshold, as represented by block 518. For example, in some embodiments, the customer selects a digital button displayed in associated with the mobile banking account to indicate that the customer consents to the exceeded credit threshold transaction. In some embodiments, by consenting to the exceeded credit threshold amount, the customer agrees to exceed the maximum credit threshold of the credit card account in order to complete the exceeded credit threshold transaction.

After the customer consents to exceeding the maximum credit threshold, the authorization server 505 approves the authorization request, as represented by block 520. As represented by block 522, the authorization server 505 also generates and sends an electronic receipt associated with the credit card transaction to the mobile banking account. In some embodiments, this electronic receipt serves as a confirmation message to confirm the customer's consent to exceeding the maximum credit threshold and/or to completing the transaction. In some embodiments, the authorization server 505 additionally or alternatively posts transaction information associated with the transaction to the mobile banking account. After the authorization request has been approved, the transaction is completed at the POS device 501, as represented by block 524.

Of course, the embodiment illustrated in FIG. 5 is merely exemplary and other embodiments may vary without departing from the scope and spirit of the present invention. For example, in some embodiments, one or more portions of the process flow being performed by the authorization server 505 are performed instead by the mobile phone 503. As another example, in some alternative embodiments of the present invention, instead of involving a credit card account and/or an exceeded credit threshold service, the process flow 500 shown in FIG. 5 involves a deposit account, surpassed balance, and/or a surpassed balance service.

Also, in some embodiments, one or more of the portions of the process flow represented by blocks 502-524 are triggered by one or more triggering events, which, in some embodiments, include the performance of one or more of the other portions of the process flow represented by blocks 502-524. Also, in some embodiments, the system 500 is configured to perform the entire process flow represented by blocks 502-524, from start to finish, within moments, seconds, and/or minutes. For example, in some embodiments, the customer consents to the exceeded credit threshold amount within approximately 1-15 minutes of the authorization server 505 receiving the authorization request from the POS device 501. Further, it will be understood that one or more portions of the process flow represented by blocks 502-524 are configured to comply with one or more requirements of an exceeded threshold regulation (e.g., Regulation E and/or the CARD Act in the United States, and the like).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, and the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, and the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for consenting to an exceeded threshold via a mobile device of a holder of an account, the method comprising:
  enrolling the holder of the account in an exceeded available funds or credit service for the account;
  providing an authorization application for installation on the mobile device of the holder of the account;

receiving an indication that the holder of the account wishes to execute a transaction at a transaction machine at a transaction location;

establishing a first communication link with the transaction machine, wherein establishing the first communication link further comprises creating a data channel with the transaction machine;

receiving, via the first communication link, transaction information associated with the transaction, wherein the transaction involves the account, the transaction machine, and the holder of the account, and wherein receiving the transaction information comprises receiving, from the holder, a primary passcode for authorizing transactions associated with the account;

determining, based at least partially on the transaction information, that the account will incur the exceeded threshold as a result of processing the transaction;

in response to determining that the account will incur the exceeded threshold as a result of processing the transaction, determining that the holder has enrolled in the exceeded available funds or credit service for the account;

in response to determining that the holder has enrolled in the exceeded available funds or credit service for the account, and during a time period while the holder is at the transaction location, establishing a second communication link with the mobile device of the holder of the account, wherein establishing the second communication link further comprises creating a wireless data channel with the mobile device;

in response to establishing the second communication link with the mobile device, prompting, via the second communication link, the mobile device to initiate the authorization application installed on the mobile device in real time to cause a graphical user interface of the mobile device to display a request for the holder to consent to the exceeded threshold via input of a secondary passcode to the mobile device, and to cause a speaker of the mobile device to output one or more audible instructions to the holder to consent to the exceeded threshold via input of the secondary passcode to the mobile device, and wherein prompting further comprises enabling the graphical user interface of the mobile device to receive input from the holder;

receiving, via input provided by the holder at the mobile device, the secondary passcode, wherein the secondary passcode represents the consent of the holder to the exceeded threshold; and authorizing the transaction based at least partially on the receiving the consent of the holder, wherein authorizing further comprises transmitting control signals configured to cause the transaction machine to complete execution of the transaction.

2. The method of claim 1, further comprising:

sending disclosure information to the holder, wherein the disclosure information defines one or more terms of the exceeded available funds or credit service, wherein the request for the holder to consent to the exceeded threshold further comprises prompting the holder to agree to the one or more terms of the exceeded available funds or credit service defined in the disclosure information.

3. The method of claim 1, wherein the causing the user interface to display the request for the holder to consent to the exceeded threshold occurs within approximately thirty seconds of the determining that the account will incur the exceeded threshold.

4. The method of claim 1, wherein the transaction machine comprises a point of sale device.

5. The method of claim 1, wherein the mobile device comprises a mobile phone.

6. An apparatus for consenting to an exceeded threshold via a mobile device associated with a holder of an account, the apparatus comprising:

a first communication interface configured to receive, via a payment network, transaction information associated with a transaction, wherein receiving transaction information further comprises establishing a first communication link with a transaction machine by creating a data channel with the transaction machine, wherein the transaction involves the account, the transaction machine, and the holder of the account;

a second communication interface configured to communicate, via a telecommunications network, with the mobile device, wherein communicating with the mobile device further comprises establishing a second communication link with the mobile device, wherein establishing the second communication link further comprises creating a wireless data channel with the mobile device; and a processor operatively connected to the first communication interface and the second communication interface, and configured to:

enroll the holder of the account in an exceeded available funds or credit service for the account;

provide an authorization application for installation on the mobile device of the holder of the account;

receive an indication that the holder of the account wishes to execute the transaction at the transaction machine at a transaction location;

receive, via the first communication link, the transaction information and a primary passcode for authorizing transactions associated with the account, wherein the primary passcode is received from the holder;

determine, based at least partially on the transaction information, that the account will incur the exceeded threshold as a result of processing the transaction;

in response to determining that the holder has enrolled in the exceeded available funds or credit service for the account, and during a time period while the holder is at the transaction location, prompt, via the second communication link, the mobile device to initiate the authorization application installed on the mobile device in real time to cause a graphical user interface of the mobile device to display a request for the holder to consent to the exceeded threshold via input of a secondary passcode to the mobile device, and to cause a speaker of the mobile device to output one or more audible instructions to the holder to consent to the exceeded threshold via input of the secondary passcode to the mobile device, and wherein prompting further comprises enabling the graphical user interface of the mobile device to receive input from the holder;

receive, via input provided by the holder at the mobile device, the secondary passcode, wherein the secondary passcode represents the consent of the holder to the exceeded threshold; and authorize the transaction based at least partially on the receiving the consent of the holder, wherein authorizing further comprises transmitting control signals configured to cause the transaction machine to complete execution of the transaction.

7. The apparatus of claim 6, wherein the second communication interface is further configured to:
send disclosure information to the holder, wherein the disclosure information defines one or more terms of the exceeded available funds or credit service, and
wherein the request for the holder to consent to the exceeded threshold further comprises promoting the holder to agree to the one or more terms of the exceeded available funds or credit service defined in the disclosure information.

8. The apparatus of claim 6, wherein the processor prompts the mobile device to initiate the authorization application within approximately thirty seconds of the processor determining that the holder has enrolled in the exceeded available funds or credit service for the account.

9. A computer program product for consenting to an exceeded threshold via a mobile device of a holder of an account, the computer program product comprising a non-transitory computer-readable medium, wherein the non-transitory computer-readable medium comprises one or more computer-executable program code portions that, when executed by a computer, cause the computer to:
enroll the holder of the account in an exceeded available funds or credit service for the account;
provide an authorization application for installation on the mobile device of the holder of the account;
receive an indication that the holder of the account wishes to execute a transaction at a transaction machine at a transaction location;
establish a first communication link with the transaction machine, wherein establishing the first communication link further comprises creating a data channel with the transaction machine;
receive, via the first communication link, transaction information associated with the transaction, wherein the transaction involves the account, the transaction machine, and the holder of the account, and wherein receiving the transaction information comprises receiving, from the holder, a primary passcode for authorizing transaction associated with the account;
determine, based at least partially on the transaction information, that the account will incur the exceeded threshold as a result of processing the transaction;
in response to determining that the account will incur the exceeded threshold as a result of processing the transaction, determine that the holder has enrolled in the exceeded available funds or credit service for the account;
in response to determining that the holder has enrolled in the exceeded available funds or credit service for the account and during a time period when the holder is at the transaction location, establish a second communication link with the mobile device of the holder of the account, wherein establishing the second communication link further comprises creating a wireless data channel with the mobile device;
in response to establishing the second communication link with the mobile device, prompt, via the second communication link, the mobile device to initiate the authorization application installed on the mobile device in real time to cause a graphical user interface of the mobile device to display a request for the holder to consent to the exceeded threshold via input of a secondary passcode to the mobile device, and to cause a speaker of the mobile device to output one or more audible instructions to the holder to consent to the exceeded threshold via input of the secondary passcode to the mobile device, and wherein prompting further comprises enabling the graphical user interface of the mobile device to receive input from the holder;
receive, via input provided by the holder at the mobile device, the secondary passcode, wherein the secondary passcode represents the consent of the holder to the exceeded threshold; and
authorize the transaction based at least partially on the receiving the consent of the holder; wherein authorizing further comprises transmitting control signals configured to cause the transaction machine to complete execution of the transaction.

10. The computer program product of claim 9, wherein the one or more computer-executable program code portions, when executed by the computer, cause the computer to:
send disclosure information to the holder, wherein the disclosure information defines one or more terms of the exceeded available funds or credit service; and
wherein the request for the holder to consent to the exceeded threshold further comprises prompting the holder to agree to the one or more terms of the exceeded available funds or credit service defined in the disclosure information.

11. The computer program product of claim 9, wherein the causing the user interface to display the request for the holder to consent to the exceeded threshold occurs within approximately fifteen seconds of the computer determining that the account will incur the exceeded threshold.

* * * * *